(12) United States Patent
He et al.

(10) Patent No.: US 11,796,234 B2
(45) Date of Patent: Oct. 24, 2023

(54) ELECTRONIC EXPANSION VALVE AND AIR CONDITIONING SYSTEM WITH ELECTRONIC EXPANSION VALVE

(71) Applicant: ZHEJIANG DUNAN ARTIFICIAL ENVIRONMENT CO., LTD., Zhejiang (CN)

(72) Inventors: Yuchen He, Zhejiang (CN); Xuefei Xu, Zhejiang (CN); Leqiang Liu, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 287 days.

(21) Appl. No.: 17/312,924

(22) PCT Filed: Dec. 17, 2019

(86) PCT No.: PCT/CN2019/126027
§ 371 (c)(1),
(2) Date: Jun. 10, 2021

(87) PCT Pub. No.: WO2020/135162
PCT Pub. Date: Jul. 2, 2020

(65) Prior Publication Data
US 2022/0042728 A1 Feb. 10, 2022

(30) Foreign Application Priority Data

Dec. 25, 2018 (CN) .......................... 201811593354.6
Mar. 13, 2019 (CN) .......................... 201920318827.5

(51) Int. Cl.
*F25B 41/34* (2021.01)
*F25B 41/35* (2021.01)

(52) U.S. Cl.
CPC .............. *F25B 41/34* (2021.01); *F25B 41/35* (2021.01); *F25B 2700/21175* (2013.01)

(58) Field of Classification Search
CPC ...................... F25B 41/35; F25B 41/34; F25B 2700/21175; F16K 1/02; Y02B 30/70
See application file for complete search history.

(56) References Cited

U.S. PATENT DOCUMENTS 6,561,480 B1    5/2003    Komiya et al.

FOREIGN PATENT DOCUMENTS

| CN | 1916455 A | 2/2007 |
|---|---|---|
| CN | 201013922 Y | 1/2008 |

(Continued)

OTHER PUBLICATIONS

European supplementary European search report dated Nov. 11, 2022.

(Continued)

*Primary Examiner* — Kun Kai Ma
(74) *Attorney, Agent, or Firm* — Gang Yu

(57) ABSTRACT

An electronic expansion valve (1-100) is provided. The electronic expansion valve (1-100) includes: a screw (1-31), a valve needle (1-22), and an elastic member (1-25). One end of the elastic member (1-25) acts on the screw (1-31) and the other end acts on the valve needle (1-22). A bearing (1-23) is arranged between the screw (1-31) and the valve needle (1-22). The bearing (1-23) has an inner ring and an outer ring. One of the screw (1-31) and the valve needle (1-22) is fixed with the inner ring of the bearing (1-23), and the other acts on the outer ring of the bearing (1-23) through the elastic member (1-25). An air conditioning system using the electronic expansion valve (1-100) is provided. In the (Continued)

electronic expansion valve (1-100), the bearing (1-23) is arranged between the valve needle (1-22) and the screw (1-31).

20 Claims, 16 Drawing Sheets

(56) References Cited

FOREIGN PATENT DOCUMENTS

| | | | | |
|---|---|---|---|---|
| CN | 101173714 | A | | 5/2008 |
| CN | 102734476 | A | | 10/2012 |
| CN | 202501077 | U | * | 10/2012 |
| CN | 202501077 | U | | 10/2012 |
| CN | 102878730 | A | | 1/2013 |
| CN | 102889410 | A | | 1/2013 |
| CN | 102927342 | A | | 2/2013 |
| CN | 203009981 | U | | 6/2013 |
| CN | 103291999 | A | * | 9/2013 | ............. F16K 1/523 |
| CN | 203421269 | U | | 2/2014 |
| CN | 103672131 | A | * | 3/2014 |
| CN | 104295784 | B | | 1/2015 |
| CN | 106641430 | A | * | 5/2017 |
| CN | 107166052 | A | | 9/2017 |
| CN | 206861006 | U | | 1/2018 |
| CN | 206874928 | U | | 1/2018 |
| CN | 108506548 | A | | 9/2018 |
| CN | 207864635 | U | | 9/2018 |
| CN | 207864635 | U | * | 9/2018 |
| CN | 208252794 | U | | 12/2018 |
| CN | 209012516 | U | * | 6/2019 |
| CN | 109990103 | A | * | 7/2019 |
| JP | 07310844 | A | | 11/1995 |
| JP | 09317922 | A | | 12/1997 |
| JP | 11315949 | A | | 11/1999 |
| JP | 2001153236 | A | | 6/2001 |
| JP | 2017203508 | A | | 11/2017 |
| WO | WO-2013127276 | A1 | * | 9/2013 | ............. F16K 1/523 |

OTHER PUBLICATIONS

European partial supplementary European search report dated Aug. 29, 2022.

First Office Action of Priority Chinese Applicaiton No. 201811593354.6 dated Jun. 16, 2021.

* cited by examiner

ELECTRONIC EXPANSION VALVE AND AIR CONDITIONING SYSTEM WITH ELECTRONIC EXPANSION VALVE

CROSS REFERENCE TO RELATED APPLICATION(S)

The present disclosure is a national stage application of International Patent Application No. PCT/CN2019/126027, which is filed on Dec. 17, 2019 and claims priority to Chinese Patent Priority No. 201811593354.6, filed to the National Intellectual Property Administration, PRC on Dec. 25, 2018, entitled "Electronic Expansion Valve and Air Conditioning System with Electronic Expansion Valve" and claims priority to Chinese Patent Priority No. 201920318827.5, filed to the National Intellectual Property Administration, PRC on Mar. 13, 2019, entitled "Electronic Expansion Valve and Refrigeration System", the disclosure of which is hereby incorporated by reference in its entirety.

TECHNICAL FIELD

The disclosure relates to a technical field of refrigeration equipment, in particular to an electronic expansion valve and an air conditioning system with the electronic expansion valve.

BACKGROUND

A valve port of an electronic expansion valve is opened or closed through the movement of a valve rod assembly in a guide sleeve and a nut sleeve, so that the purposes of flow regulating, throttling and depressurizing can be achieved, and the electronic expansion valve is widely applied in the technical field of refrigeration equipment. According to a conventional electronic expansion valve, a ball and a spring seat in contact with each other are typically arranged at one end of a screw to release relative rotation between the screw and a valve needle. However, a large friction force still exists between the ball and the spring seat, a single-point contact sliding friction form between the ball and the spring seat has a large friction force, the friction damage on contacts is easily caused, the valve needle is driven to rotate relative to the valve port, the valve needle and the valve port are abraded, and the reliability and stability of the electronic expansion valve are relatively low.

SUMMARY

Some embodiments of the disclosure provide an improved electronic expansion valve and an air conditioning system with the electronic expansion valve. The reliability and stability of the electronic expansion valve and the air conditioning system with the electronic expansion valve are improved.

Some embodiments of the disclosure provide an electronic expansion valve. The electronic expansion valve includes a screw, a valve needle, and an elastic member. One end of the elastic member acts on the screw and the other end acts on the valve needle. A bearing is arranged between the screw and the valve needle, and has an inner ring and an outer ring. One of the screw and the valve needle is fixed with the inner ring of the bearing, and the other of the screw and the valve needle acts on the outer ring of the bearing through the elastic member.

In some embodiments, the electronic expansion valve includes a gasket, the gasket is arranged between the elastic member and the outer ring of the bearing, and the gasket is connected with the outer ring of the bearing under an abutment of the elastic member.

In some embodiments, the screw is fixed with the inner ring of the bearing, and the valve needle is connected with the outer ring of the bearing through the elastic member and the gasket.

In some embodiments, the electronic expansion valve includes a valve needle sleeve for fixing the valve needle, a side surface of the screw extends outward in a radial direction of the screw and forms a bulge, and the bulge is flush with an inner side surface of the valve needle sleeve.

In some embodiments, the screw is in interference fit with the inner ring of the bearing.

In some embodiments, the valve needle is fixed with the inner ring of the bearing, and the screw is connected with the outer ring of the bearing through the elastic member and the gasket.

In some embodiments, the valve needle is in interference fit with the inner ring of the bearing.

In some embodiments, the electronic expansion valve further includes a pressing sleeve, the pressing sleeve is provided with a step surface, and the step surface abuts the valve needle to limit an axial movement of the valve needle.

In some embodiments, the gasket has a cavity extending in an axial direction of the gasket, and an inner side surface of the gasket close to the valve needle is a conical surface.

In some embodiments, the electronic expansion valve includes:
a valve seat, having an annular groove structure at an end;
a first connecting pipe, sleeved on the end of the valve seat;
a welding ring, clamped into a groove of the annular groove structure and connected with an inner wall of the first connecting pipe; where the valve seat is in clearance fit with the first connecting pipe, and the welding ring is in interference fit with the first connecting pipe; and
a boss structure, connected with the groove structure to jointly prevent the welding ring from falling off.

In some embodiments, the valve seat includes a first mounting pipe and a second mounting pipe which are connected along an axial direction, an outer diameter of the first mounting pipe is larger than an outer diameter of the second mounting pipe, the first connecting pipe is sleeved on the second mounting pipe, and both the boss structure and the annular groove structure are arranged on the second mounting pipe.

In some embodiments, an insertion hole is provided in a side wall of the first mounting pipe, and the electronic expansion valve further includes:
a second connecting pipe, inserted into the insertion hole and communicated with the first connecting pipe through the valve seat.

In some embodiments, the first connecting pipe includes a sleeve section and an extension section, the sleeve section is sleeved on the second mounting pipe and is perpendicular to the first connecting pipe, and the extension section is connected to the sleeve section.

In some embodiments, an end, connected to the second mounting pipe, of the first mounting pipe, is provided with an annular insertion slot, and the first connecting pipe is inserted into the annular insertion slot.

In some embodiments, an accommodating cavity is provided in the valve seat, the accommodating cavity communicates the first connecting pipe and the second connecting pipe, and the electronic expansion valve further includes:

a valve needle, arranged in the valve seat and provided with a needle head facing the second mounting pipe, where a maximum outer diameter of the needle head is larger than an inner diameter of the second mounting pipe.

In some embodiments, the electronic expansion valve further includes:

a cover body, mounted on the valve seat, and defining the accommodating cavity with the valve seat;

a lifting assembly, arranged in the accommodating cavity, having a central axis superposed with a central axis of the valve seat, and configured to drive the valve needle to lift along the central axis of the valve seat through rotation;

a rotor assembly, mounted in the cover body rotatably; and a screw assembly, mounted in the cover body, and having an axial limiting end connected with the lifting assembly, where the rotor assembly is arranged around the screw assembly and configured to drive the screw assembly to rotate and move axially.

In some embodiments, the lifting assembly includes a spring, a gasket, and a ball, the spring is mounted in the lifting assembly, one end of the spring is connected with the screw assembly and the other end is connected with the gasket and to the valve needle through the ball, and the ball is placed between the gasket and the valve needle to reduce a friction of the lifting assembly on the valve needle during rotation and movement of the lifting assembly in the direction of the central axis of the valve seat driven by the screw assembly.

In some embodiments, the electronic expansion valve is mounted between a liquid storage cylinder and an evaporator, a refrigerant in the liquid storage cylinder is transmitted to the evaporator through the electronic expansion valve, and the electronic expansion valve further includes:

a thermistor, arranged at an outlet of the evaporator, connected with a stator assembly fixed on a positioning piece of the valve seat in parallel and then connected to a power supply.

According to the electronic expansion valve of some embodiments of the disclosure, the groove for accommodating the welding ring is disposed on the valve seat, and the first connecting pipe is sleeved on one end of the valve seat, so that the welding ring is in interference fit with the connecting pipe after being placed in the groove, the valve seat is in clearance fit with the connecting pipe, a penetration rate of welding inside the electronic expansion valve is improved under the condition that the first connecting pipe is not easy to fall off, and the welding ring determines the welding quality of a valve seat assembly through appearance inspection in a built-in mode. Moreover, the valve seat is provided with the boss structure connected with the groove structure, the welding ring is limited on the valve seat through the boss structure and will not fall off, the welding ring is mounted in the groove in advance, and one end of the valve seat and the welding ring are inserted into the first connecting pipe together to realize automatic assembly.

Some embodiments of the disclosure further provide a refrigeration system, including a liquid storage container, an evaporator and a control valve. A refrigerant in the liquid storage container is transmitted to the evaporator through the control valve. The control valve is the electronic expansion valve as described above.

The refrigeration system of an embodiment of the disclosure has the same beneficial effects as those of the electronic expansion valve, and descriptions are omitted herein.

Some embodiments of the disclosure further provide an air conditioning system, including an electronic expansion valve. The electronic expansion valve is the electronic expansion valve as described above.

In the electronic expansion valve provided by an embodiment of the disclosure, the bearing is arranged between the valve needle and the screw, so that the rotation of the screw is released by the bearing in a multi-point rolling contact. By transforming a single-point rolling contact sliding friction of an electronic expansion valve known to inventors into a multi-point rolling contact rolling friction, the friction required for valve opening is reduced, damage caused by friction is reduced, the reliability and stability of the electronic expansion valve and the air conditioning system using the electronic expansion valve are improved, and the application prospect is broad.

BRIEF DESCRIPTION OF THE DRAWINGS

The accompanying drawings, which constitute a part of this application, are used to provide a further understanding of the disclosure, and the exemplary embodiments of the disclosure and the description thereof are used to explain the disclosure, but do not constitute improper limitations to the disclosure. In the drawings.

Figure 1:
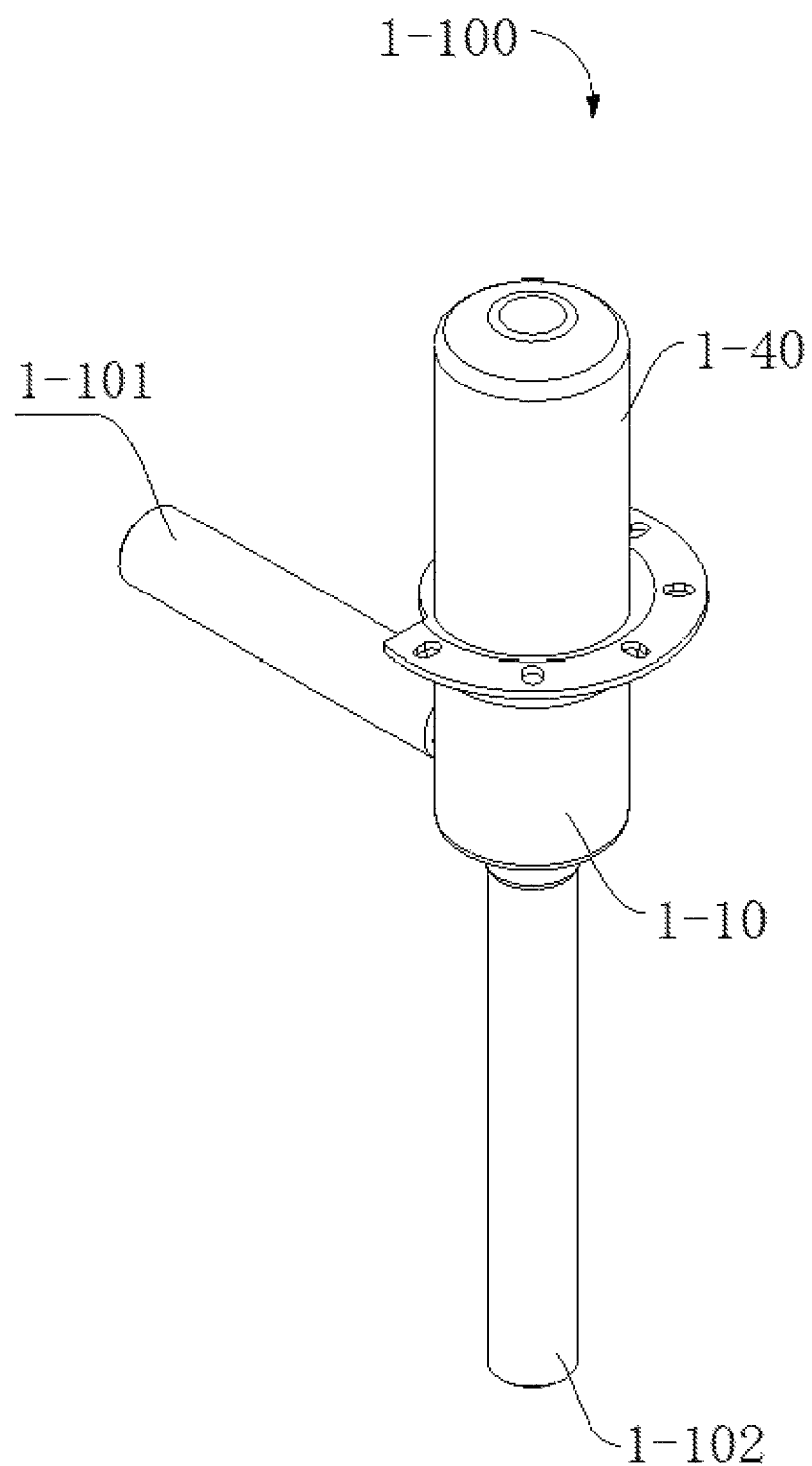
FIG. 1 is a stereogram of an electronic expansion valve with a partial structure omitted according to a first embodiment of the disclosure.

The drawings include the following reference signs:

1-100, electronic expansion valve; 1-100a, electronic expansion valve; 1-101, medium inlet pipe; 1-102, medium outlet pipe; 1-103, axis; 1-10, valve body; 1-11, valve port; 1-12, valve cavity; 1-13, through-hole; 1-14, mounting cavity; 1-15, connecting cavity; 1-151, step surface; 1-16, guide sleeve; 1-161, guide hole; 1-162, first cylindrical section; 1-162a, step; 1-162b, first end; 1-162c, second end; 1-163, second cylindrical section; 1-164, third cylindrical section; 1-165, guide structure; 1-165a, guide portion; 1-17, brace; 1-18, fixing disc; 1-181, mounting hole; 1-20, valve needle assembly; 1-21, valve needle sleeve; 1-22, valve needle; 1-22a, valve needle; 1-23, bearing; 1-23a, bearing; 1-24, gasket; 1-24a, gasket; 1-241, bulge; 1-25, elastic member; 1-25a, elastic member; 1-26, pressing sleeve; 1-261, step surface; 1-30, screw assembly; 1-31, screw; 1-31a, screw; 1-311, bulge; 1-32, nut sleeve; 1-321, second positioning step; 1-322, stop table; 1-40, sleeve; 1-50, rotor assembly; 1-51, rotor; 1-52, adapter plate; 1-53, limiting plate; 1-531, spring; 1-531a, stop portion; 1-532, stop ring; 1-54, guide piece;

2-1, valve seat; 2-2, first connecting pipe; 2-3, welding ring; 2-4, second connecting pipe; 2-5, valve needle; 2-6, cover body; 2-7, lifting assembly; 2-8, rotor assembly; 2-9, screw assembly; 2-11, boss structure; 2-12, annular groove structure; 2-13, first mounting pipe; 2-14, second mounting pipe; 2-15, annular insertion slot; 2-16, accommodating cavity; 2-21, sleeve section; 2-22, extension section; 2-71, spring; 2-72, gasket; 2-73, ball; 2-131, insertion hole.

The disclosure will be further described with reference to the above drawings and the following detailed description of the embodiments.

DETAILED DESCRIPTION OF THE EMBODIMENTS

It is to be noted that in the case of no conflict, the embodiments in the application and the features in the embodiments may be combined with each other. The disclosure is described below with the drawings and the embodiments in detail.

The technical solutions in the embodiments of the disclosure will be clearly and completely described below with reference to the drawings in the embodiments of the disclosure. Obviously, the described embodiments are only a part of the embodiments of the disclosure, not all of the embodiments. Based on the embodiments of the disclosure, all other embodiments obtained on the premise of no creative work of those of ordinary skill in the art should fall within the scope of protection of the disclosure.

It is to be noted that when an assembly is referred to as being "mounted to" another assembly, the assembly may be mounted directly on another assembly or a central assembly may also be present. When an assembly is referred to as being "arranged on" another assembly, the assembly may be arranged directly on another assembly or a central assembly may also be present. When an assembly is referred to as being "fixed to" another assembly, the assembly may be fixed directly on another assembly or a central assembly may also be present.

Unless defined otherwise, all technical and scientific terms used herein have the same meaning as commonly understood by those of ordinary skill in the art to which the disclosure belongs. The terms used herein in the description of the disclosure are for the purpose of describing particular embodiments only and are not intended to be limiting of the disclosure. As used herein, the term "or/and" includes any and all combinations of one or more of the associated listed items.

Figure 2:
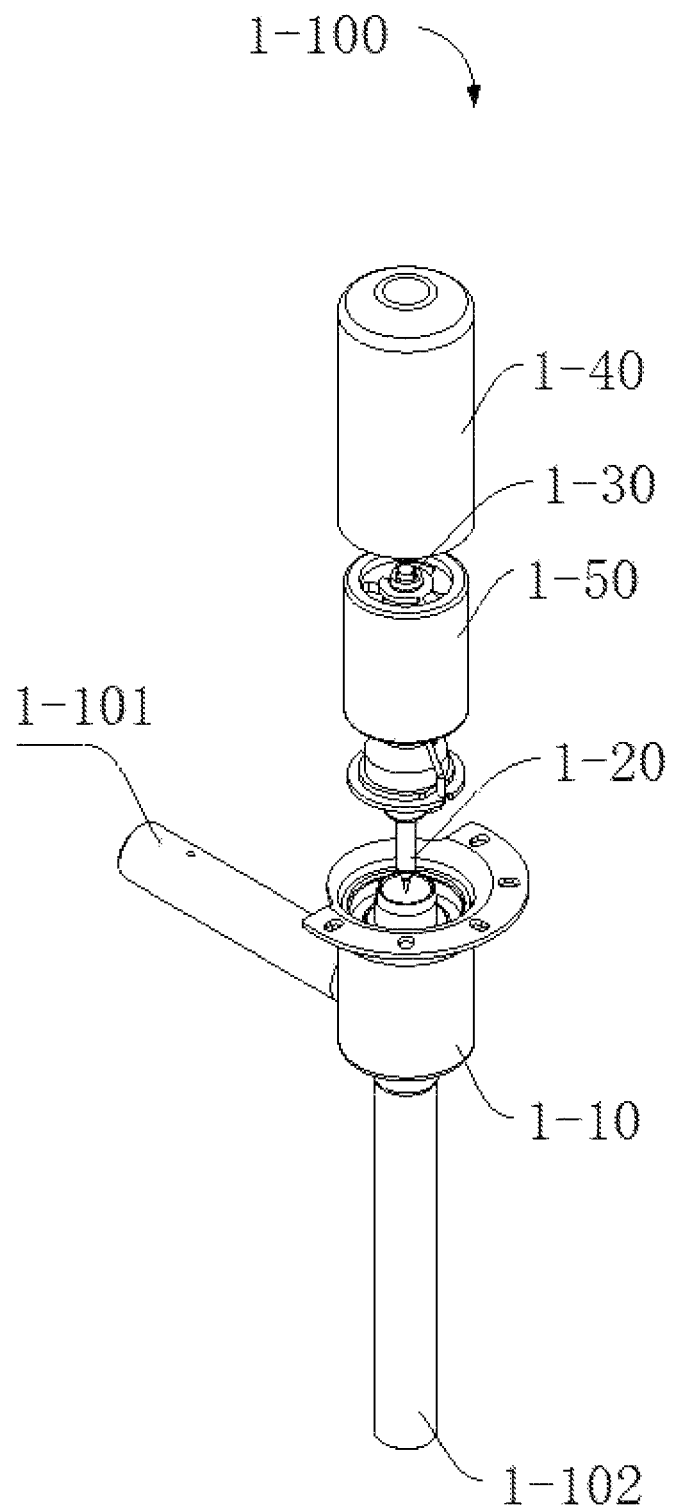
FIG. 2 is an exploded stereogram of the electronic expansion valve in FIG. 1.
Figure 3:
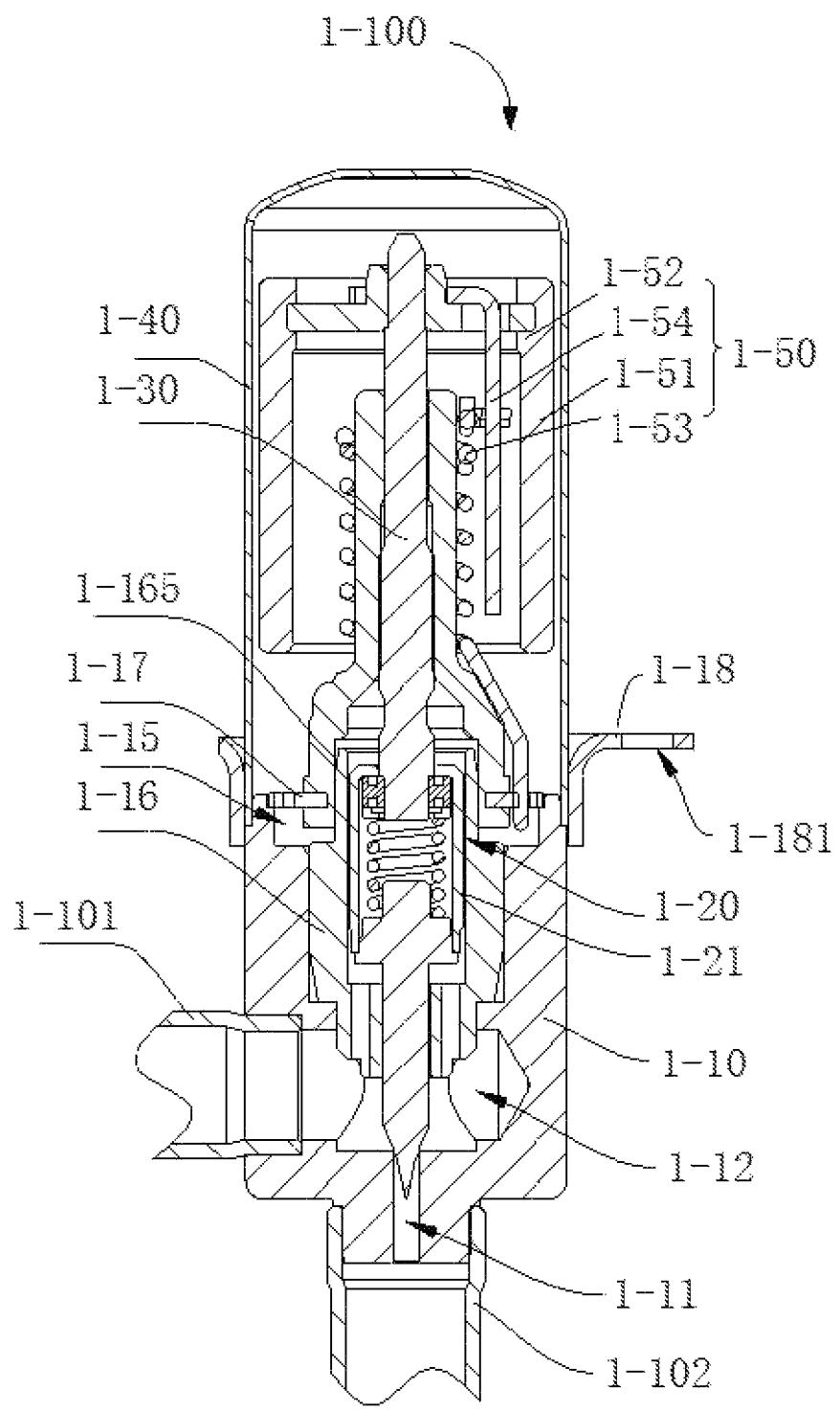
FIG. 3 is a section view of the electronic expansion valve with a partial structure omitted in FIG. 1.

Referring to FIG. 1 to FIG. 3, FIG. 1 is a stereogram of an electronic expansion valve 1-100 with a partial structure omitted according to a first embodiment of the disclosure, FIG. 2 is an exploded stereogram of the electronic expansion valve 1-100 in FIG. 1, and FIG. 3 is a section view of the electronic expansion valve 1-100 with a partial structure omitted in FIG. 1. An electronic expansion valve 1-100 provided by some embodiments of the disclosure is used to regulate the flow and the pressure of a fluid medium and realize the control on fluid flow accordingly.

In some embodiments, the electronic expansion valve 1-100 is applied to an air conditioning system, and a fluid medium flowing through the electronic expansion valve 1-100 is a refrigerant for cold and heat exchange in the air conditioning system. The electronic expansion valve 1-100 is mounted at an inlet of an evaporator of the air conditioning system. The electronic expansion valve 1-100, serving as a boundary element between a high-pressure side and a low-pressure side of the air conditioning system, throttles and depressurizes a high-pressure liquid refrigerant, so that the dosage of the liquid refrigerant entering the evaporator or other devices is adjusted and controlled, and the dosage of the liquid refrigerant meets the requirements of external refrigeration loads.

It will be appreciated that in other embodiments, the electronic expansion valves 1-100 may also be applied to other types of refrigeration equipment other than the air conditioning system, and that there may be other fluid media than the refrigerant flowing through the electronic expansion valves 1-100, so long as the electronic expansion valve 1-100 can throttle and depressurize such fluid media.

The electronic expansion valve 1-100 includes a valve body 1-10, a valve needle assembly 1-20, a screw assembly 1-30, a guide sleeve 1-16, a sleeve 1-40, a rotor assembly 1-50, and a stator assembly (not shown). The valve needle assembly 1-20, the screw assembly 1-30, the sleeve 1-40, the guide sleeve 1-16, and the stator assembly are all mounted on the valve body 1-10. One end of the screw assembly 1-30 is connected with the valve needle assembly 1-20, and the other end is connected with the rotor assembly 1-50.

The valve body 1-10 is used to carry the valve needle assembly 1-20, the screw assembly 1-30, the guide sleeve 1-16, the sleeve 1-40, and the stator assembly, the valve needle assembly 1-20 is used to control the opening or closing of the electronic expansion valve 1-100, the screw assembly 1-30 is used to drive the valve needle assembly 1-20 to move, and the sleeve 1-40 separates an external environment from the valve needle assembly 1-20, the screw assembly 1-30, and the rotor assembly 1-50, so that the valve needle assembly 1-20, the screw assembly 1-30 and the rotor assembly 1-50 are protected from medium leakage, the rotor assembly 1-50 is used to drive the screw assembly 1-30 to move, and the stator assembly is used to drive the rotor assembly 1-50 to move.

The stator assembly is electrified to generate a magnetic field and drive the rotor assembly 1-50 to rotate under an action of a magnetic force, the rotor assembly 1-50 drives the screw assembly 1-30 to move, and the valve needle assembly 1-20 controls the electronic expansion valve 1-100 to be opened or closed under a drive of the screw assembly 1-30, so that a purpose of regulating the flow and the pressure of a fluid medium by the electronic expansion valve 1-100 is achieved.

Figure 4:
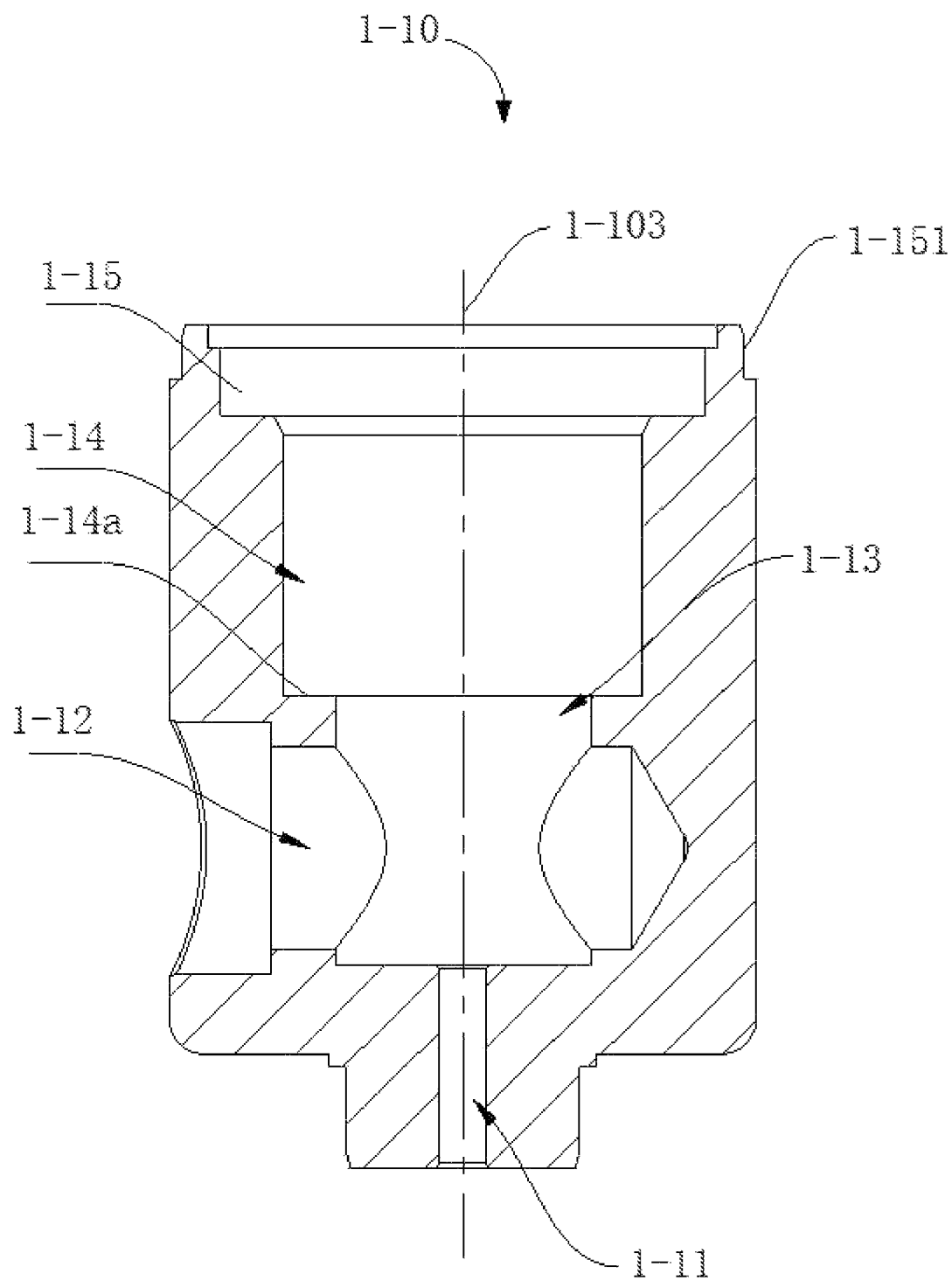
FIG. 4 is a structural diagram of a valve body in the electronic expansion valve in FIG. 1.

Referring to FIG. 4, FIG. 4 is a structural diagram of the valve body 1-10 in the electronic expansion valve 1-100 in FIG. 1. Two sides of the valve body 1-10 are respectively connected with a medium inlet pipe 1-101 and a medium outlet pipe 1-102. A medium fluid enters the electronic expansion valve 1-100 through the medium inlet pipe 1-101, and then flows out of the electronic expansion valve 1-100 through the medium outlet pipe 1-102. In a direction of its axis 1-103, the valve body 1-10 is sequentially provided with a valve port 1-11, a valve cavity 1-12, a through hole 1-13, a mounting cavity 1-14, and a connecting cavity 1-15. The valve port 1-11, the valve cavity 1-12, the through hole 1-13, the mounting cavity 1-14, and the connecting cavity 1-15 are sequentially communicated in the direction of the axis 1-103.

The valve port 1-11 is communicated with the medium outlet pipe 1-102, and the valve port 1-11 is used to allow the valve needle assembly 1-20 to stretch in, so that the fluid medium in the electronic expansion valve 1-100 is blocked from being discharged outwards through the valve port 1-11. When the valve needle assembly 1-20 closes the valve port 1-11, i.e., the valve port 1-11 is disconnected from the valve cavity 1-12, the electronic expansion valve 1-100 is closed. When the valve needle assembly 1-20 unseals the valve port 1-11, i.e., the valve port 1-11 is communicated with the valve cavity 1-12, the electronic expansion valve 1-100 is opened.

The valve cavity 1-12 is used to accommodate a part of the needle assembly 1-20, and the fluid medium flows into the valve port 1-11 through the valve cavity 1-12. The through hole 1-13 is provided between the valve cavity 1-12 and the mounting cavity 1-14, an aperture of the through hole 1-13 is smaller than an inner diameter of the mounting cavity 1-14, an annular first positioning step 1-14a is formed at a bottom of the mounting cavity 1-14, the guide sleeve 1-16 is accommodated in the valve body 1-10, and the through hole 1-13 and the mounting cavity 1-14 are mutually matched to fixedly mount the guide sleeve 1-16. A connecting piece 1-17 for fixing the screw assembly 1-30 is further arranged in the connecting cavity 1-15, and the connecting cavity 1-15 and the connecting piece 1-17 are mutually matched to accommodate and fix the screw assembly 1-30.

An end surface of the valve body 1-10 provided with the connecting cavity 1-15 is contracted towards the direction of the axis 1-103 to form a step surface 1-151, the sleeve 1-40 is sleeved with an end of the valve body 1-10 provided with the connecting cavity 1-15 and abuts the step surface 1-151, the step surface 1-151 limits an extension length of the sleeve 1-40 sleeved with the valve body 1-10, and an end surface of the valve body 1-10 provided with the connecting cavity 1-15 penetrates through the sleeve 1-40 so as to limit a radial movement of the sleeve 1-40.

In some embodiments, in order to further improve the connection stability of the valve body 1-10 and the sleeve 1-40, the valve body 1-10 and the sleeve 1-40 are fixedly connected with each other through welding, and at this time, the step surface 1-151 is a welding fixing surface between the valve sleeve 1-40 and the valve body 1-10. It will be appreciated that in other embodiments, the valve body 1-10 and the sleeve 1-40 may be fixedly connected in other connection manners such as riveting and gluing.

In some embodiments, the valve body 1-10 is machined from stainless steel, and the valve body 1-10 is substantially cylindrical. It will be appreciated that in other embodiments, the valve body 1-10 may be machined from other materials that are not listed one by one herein and that the valve body 1-10 may take other shapes than the cylindrical shape.

Figure 5:
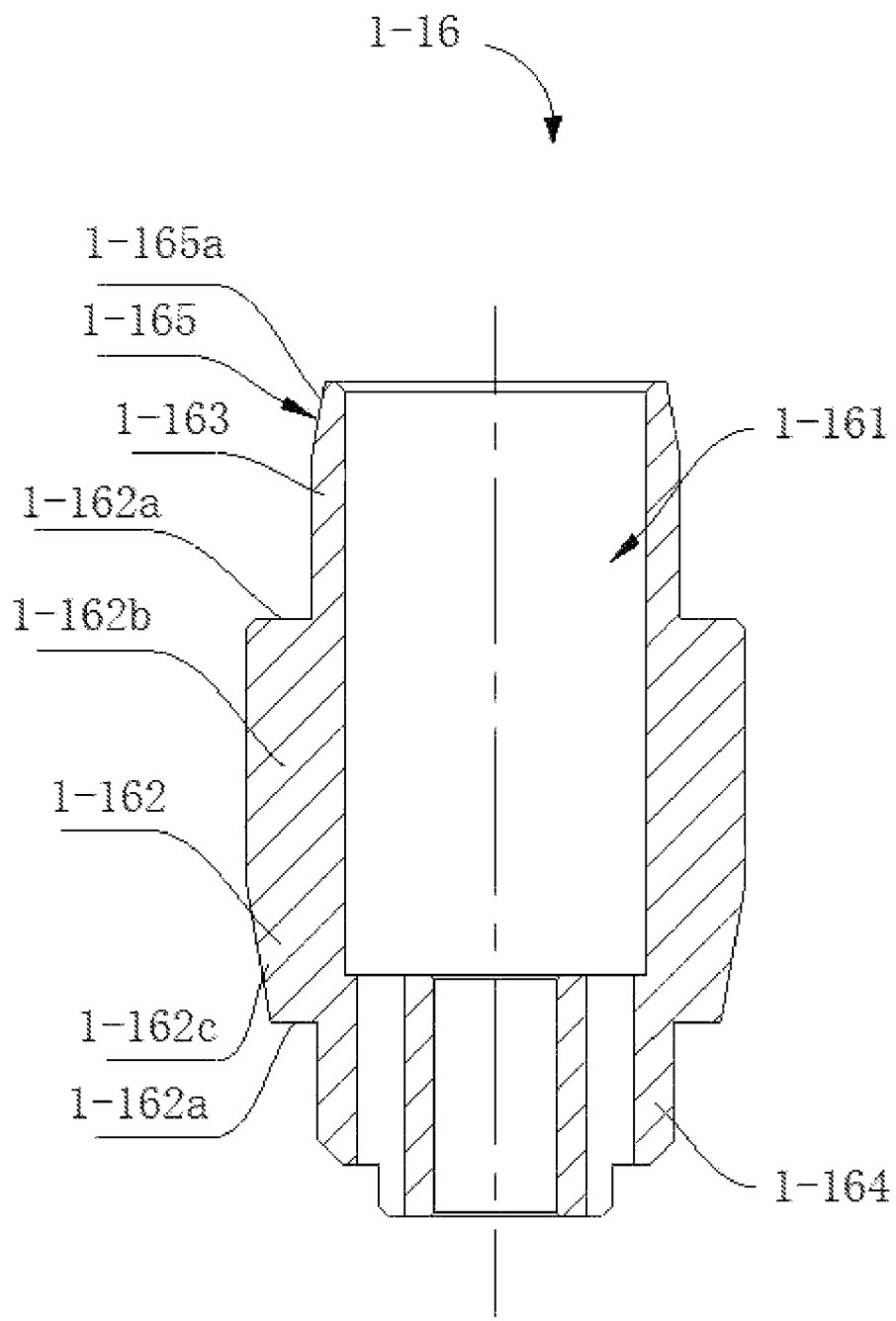
FIG. 5 is a structural diagram of a guide sleeve in the electronic expansion valve in FIG. 3.

Referring to FIG. 5, FIG. 5 is a structural diagram of the guide sleeve 1-16 in the electronic expansion valve 1-100 in FIG. 3. The guide sleeve 1-16 is mounted in the mounting cavity 1-14 and is in interference fit with the mounting cavity 1-14. Here, the interference fit means that an inner diameter size of the mounting cavity 1-14 minus an outer diameter size of the matched guide sleeve 1-16 is negative. The guide sleeve 1-16 is used to guide the movement of the valve needle assembly 1-20 in the direction of the axis 1-103 of the valve body 1-10. The connecting piece 1-17 is mounted in the connection cavity 1-15 for mounting the screw assembly 1-30. In some embodiments, the connection piece 1-17 is mounted in the connection cavity 1-15 by welding.

In some embodiments, the guide sleeve 1-16 is machined from brass materials, i.e. the guide sleeve 1-16 is a brass guide sleeve. The brass guide sleeve is relatively soft to facilitate mounting between the guide sleeve 1-16 and the screw assembly 1-30 and/or the valve body 1-10. It will be appreciated that in other embodiments, the guide sleeve 1-16 may be machined from materials other than brass.

The guide sleeve 1-16 is substantially cylindrical. A guide hole 1-161 passing through the guide sleeve 1-16 is provided in the guide sleeve 1-16 along the axis of the guide sleeve, and the valve needle assembly 1-20 is mounted in the guide hole 1-161 and moves under the guide of the guide hole 1-161.

The guide sleeve 1-16 includes a first cylindrical section 1-162 mounted in the mounting cavity 1-14, a second cylindrical section 1-163 cooperated with the screw assembly 1-30, and a third cylindrical section 1-164 located in the valve cavity 1-12.

The first cylindrical section 1-162 is in interference fit with the mounting cavity 1-14 to ensure that the axis of the guide sleeve 1-16 is superposed with the axis 1-103 of the valve body 1-10 during mounting of the guide sleeve 1-16, thereby ensuring coaxiality between the guide sleeve 1-16 and the valve port 1-11.

In some embodiments, the first cylindrical section 1-162 is an intermediate section, i.e. located between the second cylindrical section 1-163 and the third cylindrical section 1-164. An outer diameter of the first cylindrical section 1-162 is larger than an outer diameter of the second cylindrical section 1-163 and an outer diameter of the third cylindrical section 1-164, respectively. Thus, it should be understood that steps 1-162a are formed between the first cylindrical section 1-162 and the second cylindrical section 1-163 and between the first cylindrical section 1-162 and the third cylindrical section 1-164, respectively. The step 1-162a between the first cylindrical section 1-162 and the third cylindrical section 1-164 is cooperated with a first positioning step 1-14a at the bottom of the mounting cavity 1-14 to achieve the positioning of the third cylindrical section 1-164.

In some embodiments, the first cylindrical section 1-162 has a first end 1-162b and a second end 1-162c arranged oppositely, the second cylindrical section 1-163 is connected to the first end 1-162b of the first cylindrical section 1-162, and the third cylindrical section 1-164 is connected to the second end 1-162c of the first cylindrical section 1-162.

In some embodiments, the second end 1-162c of the first cylindrical section 1-162 has a guide structure 1-165 to facilitate mounting between the first cylindrical section 1-162 and the mounting cavity 1-14. In some embodiments, the guide structure 1-165 includes a guide portion arranged at the second end 1-162c of the first cylindrical section. Specifically, the guide portion is a rounded guide portion or a conical guide portion.

In some embodiments, a length of the second cylindrical section 1-163 is ¼ to ⅓ times a length of the guide sleeve. At this time, the guide sleeve 1-16 has a sufficient matching size to be cooperated with the screw assembly 1-30, thereby improving the reliability of the connection while reducing the risk of loosening of the guide sleeve 1-16 due to vibrations and the like.

In some embodiments, the first end 1-162b of the second cylindrical section 1-163 away from the first cylindrical section also has a guide structure 1-165. Here, the guide structure 1-165 is provided to facilitate mounting between the guide sleeve 1-16 and the screw assembly 1-30.

In some embodiments, the guide structure 1-165 includes a guide portion 1-165a arranged at the second cylindrical section 1-163 away from the first cylindrical section 1-162. In an embodiment, the guide portion 1-165a is a rounded guide portion or a conical guide portion.

Figure 6:
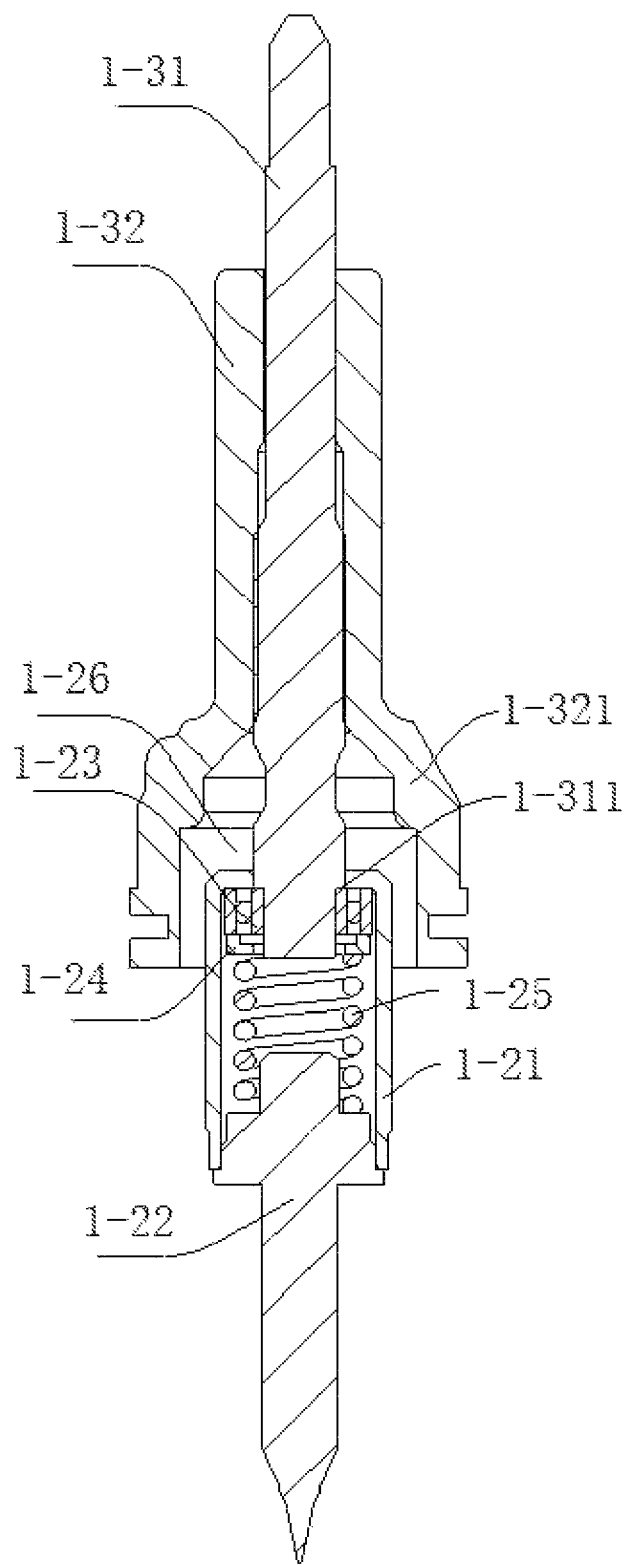
FIG. 6 is a section view of a screw assembly in the electronic expansion valve in FIG. 1.
Figure 7:
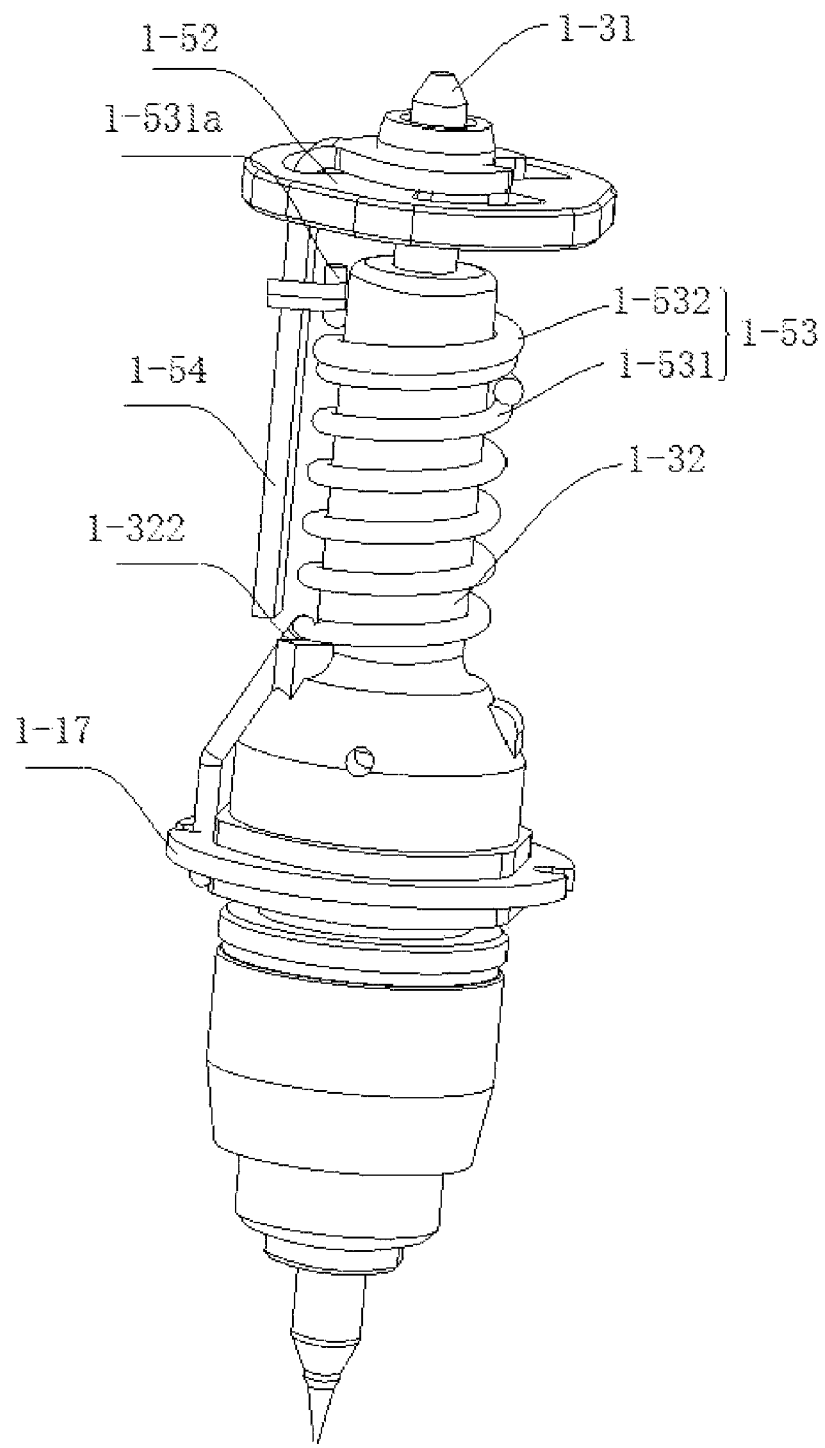
FIG. 7 is a section view of a screw assembly and a rotor assembly in the electronic expansion valve in FIG. 1.

Referring to FIGS. 6 and 7, FIG. 6 is a cross-sectional view of the screw assembly 1-30 in the electronic expansion valve 1-100 in FIG. 1, and FIG. 7 is a cross-sectional view of the screw assembly 1-30 and the rotor assembly 1-50 in the electronic expansion valve 1-100 in FIG. 1.

The valve needle assembly 1-20 includes a valve needle sleeve 1-21 mounted in the guide sleeve 1-16, and a valve needle 1-22 mounted in the valve needle sleeve 1-21. The valve needle 1-22 has an axis, and the axis of the valve needle 1-22 is superposed with the axis 1-103 of the valve body 1-10. One end of the valve needle 1-22 is connected with the screw assembly 1-30, and the other end is cooperated with the valve port 1-11. The screw assembly 1-30 drives the valve needle 1-22 to move so as to control the opening or closing of the valve port 1-11, thereby realizing the opening/closing of the electronic expansion valve 1-100.

The valve needle assembly 1-20 further includes a bearing 1-23, a gasket 1-24 and an elastic member 1-25. The bearing 1-23 and the gasket 1-24 are arranged at one end, close to the valve needle 1-22, of the screw assembly 1-30. One end of the elastic member 1-25 is in contact with the gasket 1-24, and the other end is in contact with the valve needle 1-22. One end of the bearing 1-23 abuts against the screw assembly 1-30 and the valve needle sleeve 1-21, and the other end is in contact with the gasket 1-24. The gasket 1-24 is accommodated in the valve needle sleeve 1-21 and is in contact with an outer ring of the bearing 1-23.

The screw assembly 1-30 includes a nut sleeve 1-32 and a screw 1-31 mounted in the nut sleeve 1-32. The screw 1-31 has a first end and a second end arranged oppositely, the first end of the screw 1-31 is connected with the rotor assembly 1-50, and the second end of the screw 1-31 penetrates into the nut sleeve 1-32 and is connected with the bearing 1-23. One end of the nut sleeve 1-32 is mounted on the connecting piece 1-17, and the other end is located in the sleeve 1-40.

The screw 1-31 is provided with a bulge 1-311 extending in a radial direction of the screw 1-31, and the bulge 1-311 is flush with an inner side surface of the valve needle sleeve 1-21. The outer ring of the bearing 1-23 abuts against the bulge 1-311 and the inner side surface of the valve needle sleeve 1-21, and the abutment of the bulge 1-311 and the inner side surface of the valve needle sleeve 1-21 against the outer ring of the bearing 1-23 realizes limiting of the screw 1-31 and the valve needle sleeve 1-21 to the bearing 1-23.

The screw 1-31 is fixedly connected with an inner ring of the bearing 1-23. In the present embodiment, the screw 1-31 and the inner ring of the bearing 1-23 are fixed to each other through an interference fit, i.e., the size of the screw rod 1-31 is larger than the aperture of the inner ring of the bearing 1-23. At this time, the screw 1-31 and the bearing 1-23 have relatively better connection stability.

It will be appreciated that in other embodiments, the screw 1-31 and the inner ring of the bearing 1-23 may be fixed to each other in other connection manners such as riveting and gluing.

The screw 1-31 rotates under the drive of the rotor assembly 1-50, and due to the fixed connection between the screw 1-31 and the inner ring of the bearing 1-23, the screw 1-31 drives the inner ring of the bearing 1-23 to rotate. A rolling element in the bearing 1-23 is in rolling contact with the outer ring of the bearing 1-23, thereby releasing the rotation of the screw 1-31. The bearing 1-23 has a plurality of rolling elements therein, so that the release of the rotation of the screw 1-31 is changed from a single-point rolling contact in the electronic expansion valve 1-100 known to inventors to a multi-point rolling contact in the embodiment. Therefore, the contact force is shared and borne by the plurality of rolling elements, the contact pressure on each contact point is reduced, and the rolling friction is reduced. The rotation of the screw is released by the bearing, so that relative rotation friction cannot occur when the valve needle is in contact with the valve port, and the reliability and life of the valve needle and the valve port are improved and prolonged.

In addition, due to the coaxial mounting of the bearing 1-23 and the screw 1-31, the contact force on the rolling elements is perpendicular to a gravity direction of the screw 1-31, so that the contact force on the contact point in the electronic expansion valve known to inventors is relatively reduced, and the stability and reliability of the electronic expansion valve 1-100 are improved.

In some embodiments, the elastic member 1-25 is a spring. At this time, the elastic member 1-25 has relatively high connection stability. It will be appreciated that in other embodiments, the elastic member 1-25 may also be other types of elastic members such as an elastic column.

In some embodiments, the second cylindrical section 1-163 extends from the first end of the nut sleeve 1-32 into the nut sleeve 1-32 and is fixedly connected with the nut sleeve 1-32. In some embodiments, the fixed connection includes a threaded connection or any one of an interference fit or a transition fit. In the present embodiment, the second cylindrical section 1-163 and the nut sleeve 1-32 are in transition fit to guide the nut sleeve 1-32 through the second cylindrical section 1-163, such that the axis of the nut sleeve 1-32 is superposed with the axis of the guide sleeve 1-16 and the axis 1-103 of the valve body 1-10.

It will be appreciated that the valve body 1-10 is guided by the first cylindrical section 1-162 and the nut sleeve 1-32 is guided by the second cylindrical section 1-163. Therefore, the axes of the valve body 1-10, the guide sleeve 1-16 and the nut sleeve 1-32 are superposed, so that the coaxiality between the valve needle 1-22 and the valve port 1-11 is ensured, the collision between the valve needle 1-22 and the valve body 1-10 is reduced in the movement process, the abrasion of components such as the valve needle 1-22 is reduced, and the service life of the electronic expansion valve 1-100 is prolonged.

The nut sleeve 1-32 is in threaded connection with the screw 1-31. Because the nut sleeve 1-32 is welded on the connecting piece 1-17, when the screw 1-31 rotates under the drive of a rotor 1-51, due to a nut-screw matching relationship formed between the nut sleeve 1-32 and the screw 1-31, the screw 1-31, the rotor assembly 1-50 and the like fixedly connected with the screw 1-31 move telescopically along the axial direction of the screw 1-31, so that a process of movement of the valve needle assembly 1-20 driven by the screw 1-31 is realized.

A second positioning step 1-321 is arranged in the nut sleeve 1-32, and the second cylindrical section 1-163 extends into the nut sleeve 1-32 and abuts against the second positioning step 1-321, so that a mounting reliability of the guide sleeve 1-16 is improved, and the guide sleeve 1-16 is prevented from axially moving and generating noise.

The rotor assembly 1-50 includes a rotor 1-51 located in the sleeve 1-40, an adapter plate 1-52 for mounting the screw 1-31, a limiting member 1-53 for limiting a rotation angle of the rotor 1-51, and a guide piece 1-54 mounted on the adapter plate 1-52. The rotor 1-51 is mounted on the adapter plate 1-52. The adapter plate 1-52 and the screw 1-31 are fixedly connected by welding or the like.

The limiting member 1-53 includes a spring 1-531 sleeved on the nut sleeve, and a stop ring 1-532 mounted on the spring 1-531. One end of the spring 1-531 is connected with the connecting piece 1-17. The other end of the spring 1-531 is provided with a stop portion 1-531*a*. The stop ring 1-532 is wound around the spring 1-531. In some embodiments, a stop table 1-322 is arranged on an outer wall of the nut sleeve 1-32, and the stop table 1-322 is cooperated with the stop ring 1-532 to limit the rotation angle of the rotor 1-51.

When the rotor 1-51 rotatably moves along the axis 1-103, the rotor 1-51 drives the screw 1-31 to drive the valve needle 1-22 to close, the stop ring 1-532 moves along the spring 1-531, and the stop ring 1-532 abuts against the stop table 1-322 to limit a rotation angle of the rotor 1-51 as a lower limit of the rotor 1-51. When the rotor 1-51 rotatably moves along the axis 1-103 to drive the screw 1-31 to drive the valve needle 1-22 to close the valve port 1-11, the stop ring 1-532 moves along the spring 1-531, and the stop ring 1-532 abuts against the stop portion 1-531*a* to limit the rotation angle of the rotor 1-51 as an upper limit of the rotor 1-51.

The stator assembly includes components such as coils, is used to generate a magnetic field after being electrified, and drives the rotor 1-51 to rotate under the action of the magnetic field force, so as to drive the screw 1-31 to rotate.

In the present embodiment, the valve body 1-10 is further provided with a fixing disc 1-18, the fixing disc 1-18 is used to carry and fix the stator assembly, the fixing disc 1-18 is further provided with a plurality of mounting holes 1-181, and the mounting holes 1-181 are used to fixedly mount the stator assembly on the fixing disc 1-18.

In the present embodiment, the electronic expansion valve 1-100 is an electric electronic expansion valve, the rotor 1-51 is a motor rotor made of permanent magnets in a stepping motor, the stator assembly is a motor stator in the stepping motor, the stepping motor transmits signals to phase coils of the motor stator after receiving logic digital signals provided by a control circuit, and the motor rotor made of the permanent magnets rotatably moves under the action of magnetic torque, so that the movement process that the stator assembly drives the rotor assembly to rotate is realized.

The operating principle of the electronic expansion valve 1-100 is explained below.

After the stator assembly is electrified, a magnetic field is generated, the rotor 1-51 made of a magnetic material rotates under the drive of the magnetic field, the rotor 1-51 is fixedly connected with the screw 1-31 through the guide piece 1-54, the screw 1-31 is driven to rotate by the rotation of the rotor 1-51, nut-screw cooperation is formed between the screw 1-31 and the nut sleeve 1-32, and the nut sleeve 1-32 is fixedly arranged on the valve body 1-10. Therefore, the rotation of the screw 1-31 relative to the nut sleeve 1-32 drives the screw 1-31 to move telescopically relative to the nut sleeve 1-32, so that an operating process that the stator assembly drives the rotor assembly 1-50 to move and the rotor assembly 1-50 drives the screw assembly 1-30 to move is realized.

The telescopic movement of the screw 1-31 relative to the direction of the axis 1-103 of the valve body 1-10 drives the valve needle 1-22 to move through the elastic member 1-25, and the valve needle 1-22 moves towards the valve port 1-11 in the valve body 1-10 under the drive of the screw 1-31. When the valve needle 1-22 closes the valve port 1-11, i.e., when the valve cavity 1-12 is disconnected from the valve port 1-11, the electronic expansion valve 1-100 is closed. When the valve needle 1-22 unseals the valve port 1-11, i.e., the valve cavity 1-12 is communicated with the valve port 1-11, the electronic expansion valve 1-100 is opened. Because an opening caliber of the valve port 1-11 in the electronic expansion valve 1-100 is relatively small, the flow quantity of a fluid medium is reduced, so that the throttling and depressurizing process of the electronic expansion valve 1-100 on the fluid medium is realized.

Figure 8:
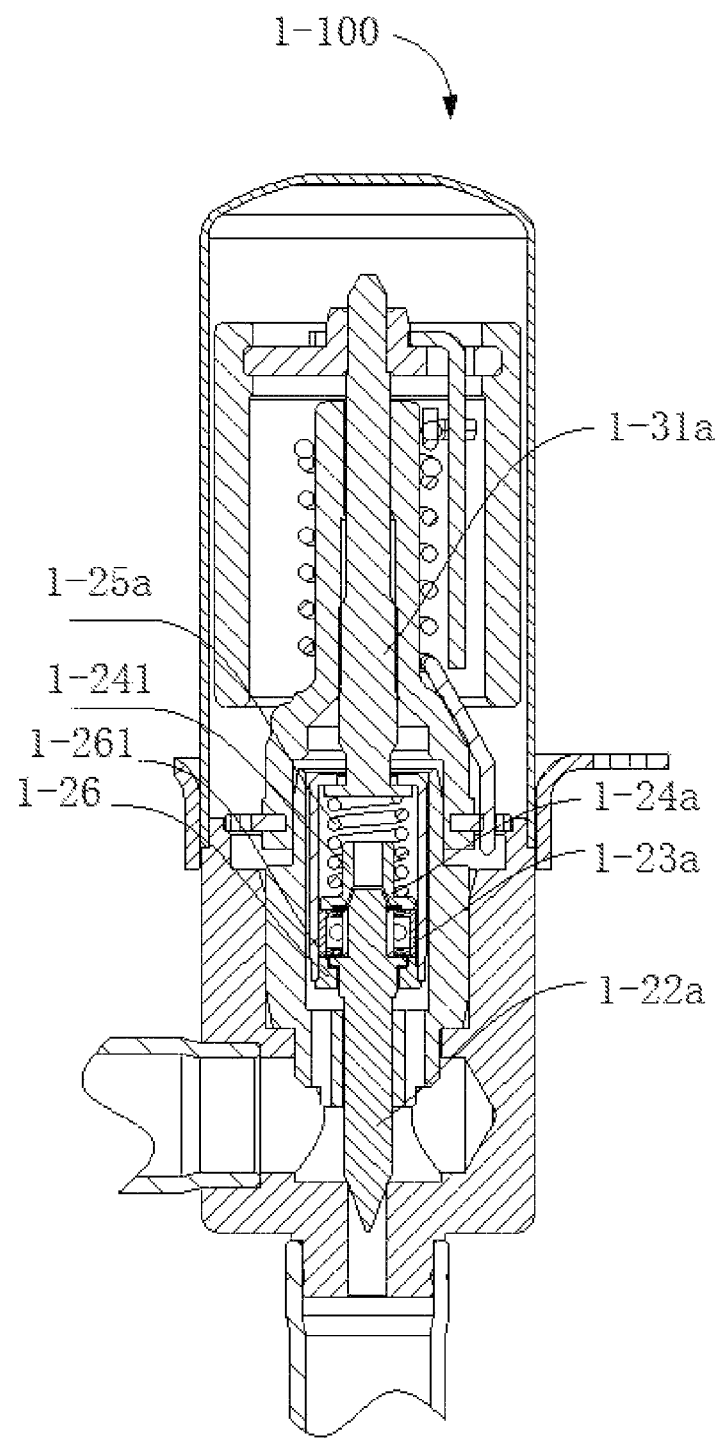
FIG. 8 is a section view of an electronic expansion valve according to a second embodiment of the disclosure.
Figure 9:
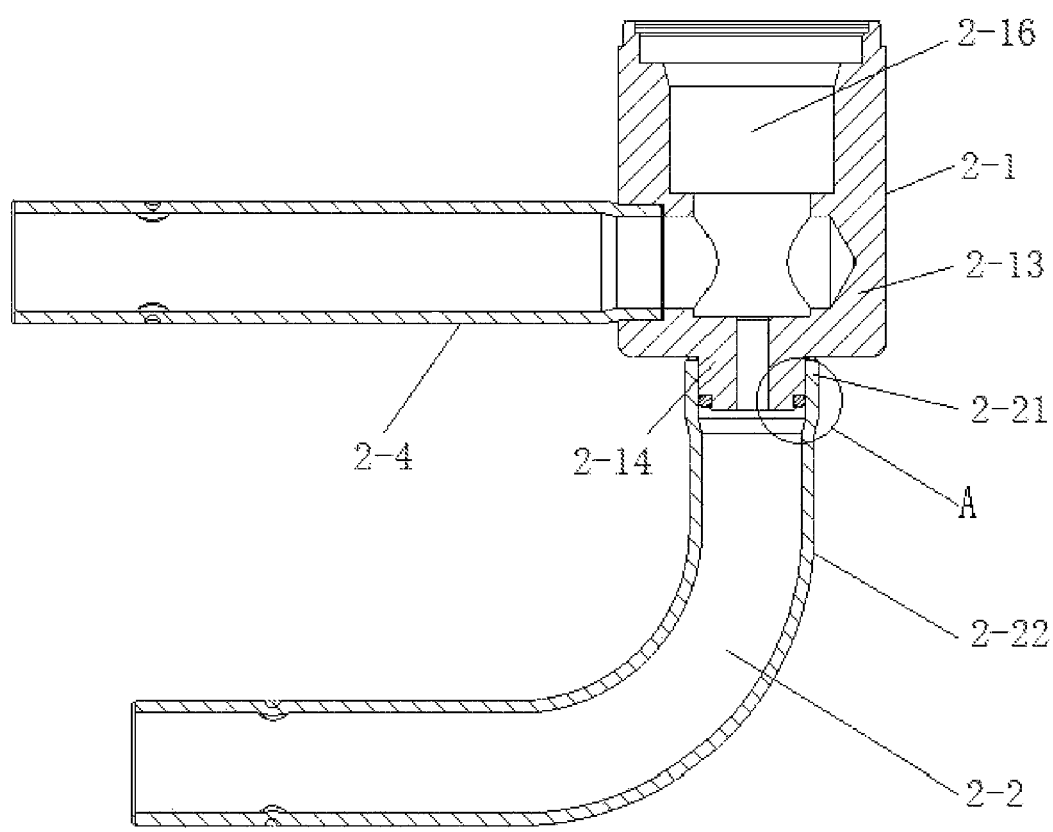
FIG. 9 is a structural diagram of a valve seat component of an electronic expansion valve according to a third embodiment of the disclosure.
Figure 10:
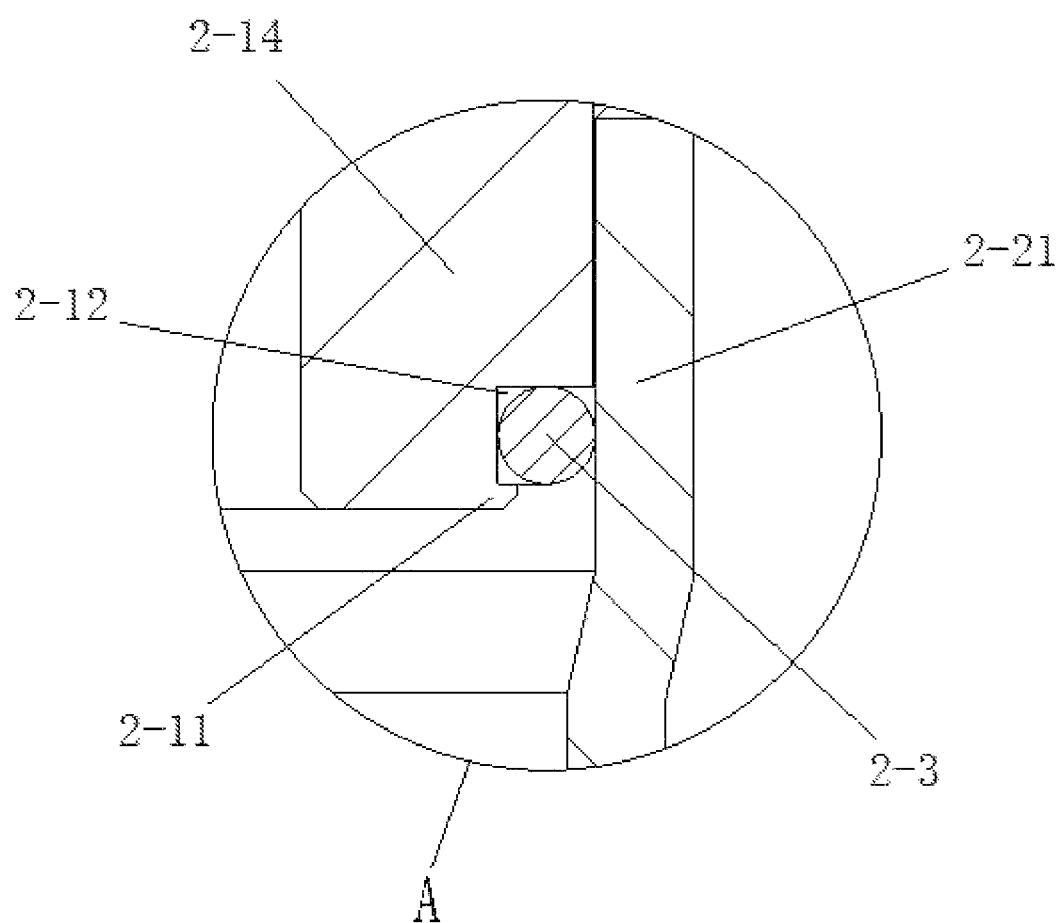
FIG. 10 is an enlarged view of region A in FIG. 9.
Figure 11:
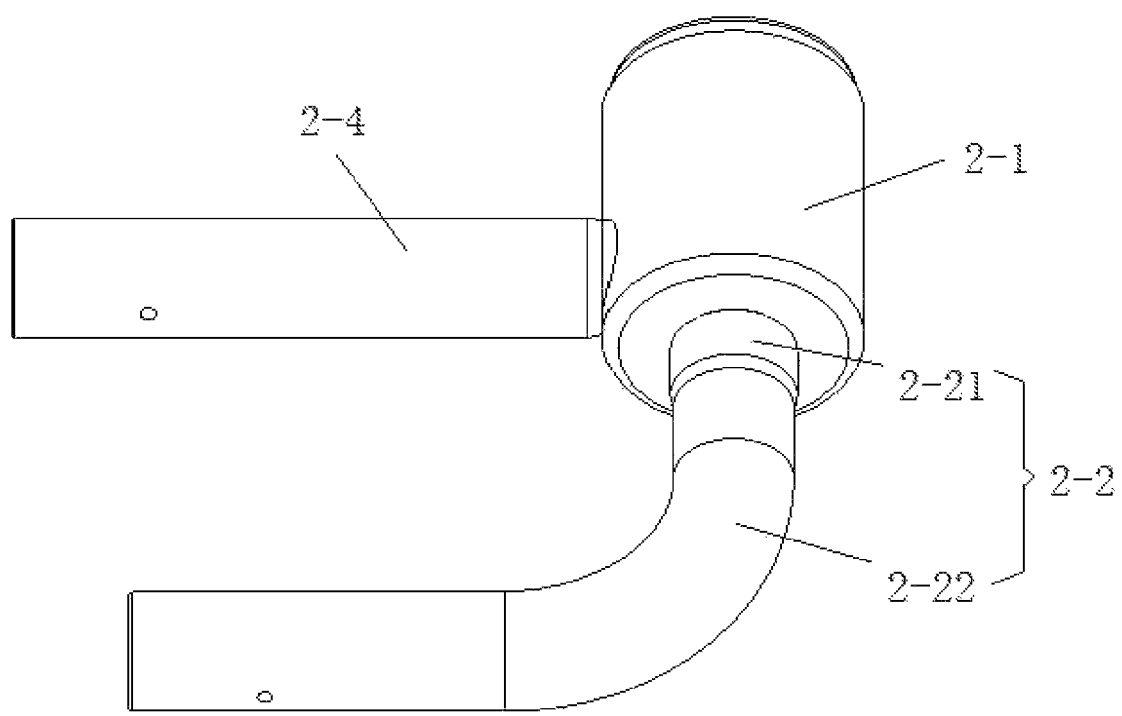
FIG. 11 is a stereogram of the valve seat component of the electronic expansion valve in FIG. 9.
Figure 12:
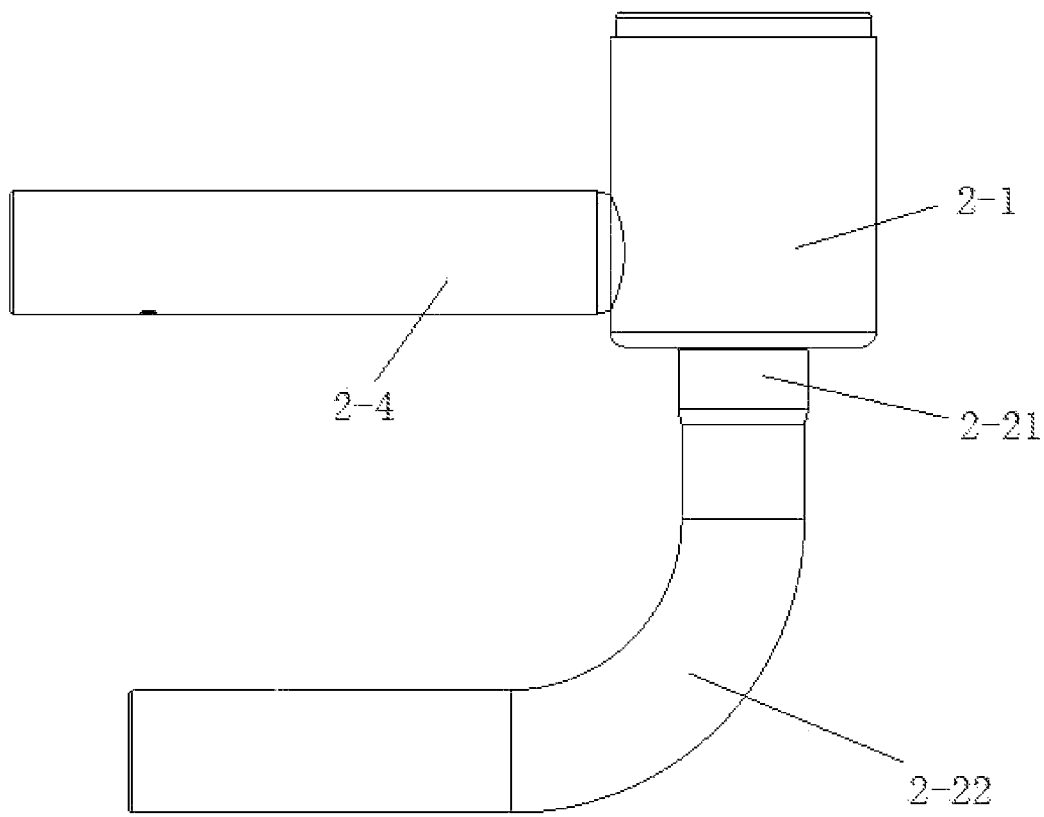
FIG. 12 is a front view of the valve seat component of the electronic expansion valve in FIG. 9.
Figure 13:
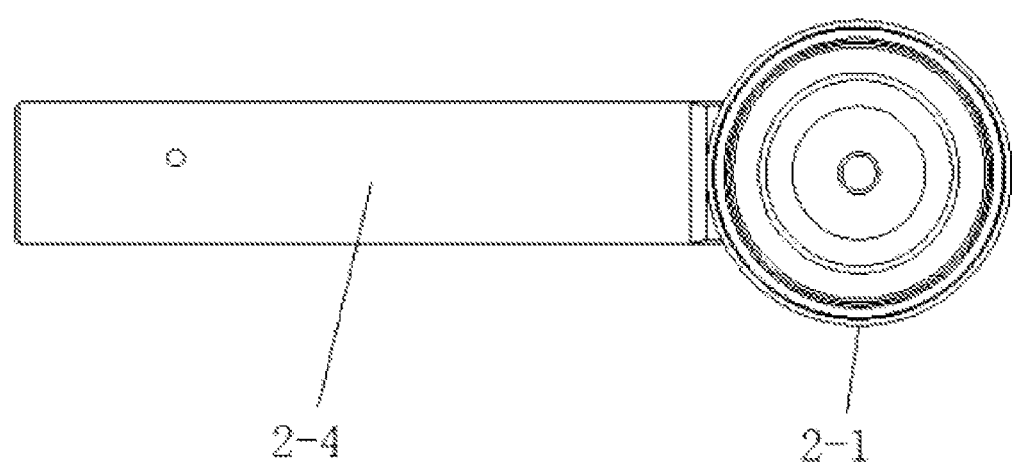
FIG. 13 is a top view of the valve seat component of the electronic expansion valve in FIG. 9.
Figure 14:
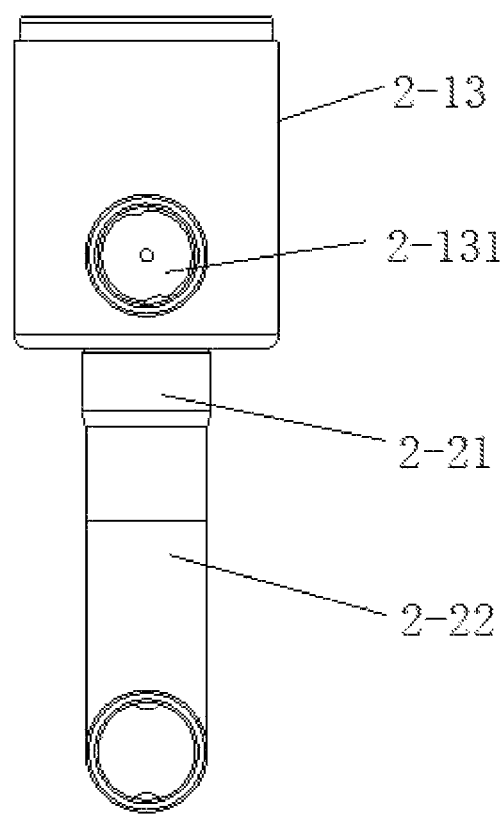
FIG. 14 is a side view of the valve seat component of the electronic expansion valve in FIG. 9.

Referring to FIG. 8, FIG. 8 is a cross-sectional diagram of an electronic expansion valve 1-100*a* according to a second embodiment of the disclosure. Unlike the first embodiment of the disclosure in which the bearing 1-23 is arranged at an end of the screw 1-31 close to the valve needle 1-22, in the second embodiment, a bearing 1-23*a* is arranged at an end of a valve needle 1-22*a* close to a screw 1-31*a*.

It will be appreciated that as long as the bearing 1-23 is arranged between the screw 1-31 and the valve needle 1-22, whether the bearing 1-23 is arranged on the screw 1-31 or directly on the valve needle 1-22, a single-point rolling contact of the electronic expansion valve known to inventors can be transformed into a multi-point rolling contact, thereby reducing the friction damage caused by valve opening using the better distribution characteristics of the multi-point rolling contact, and the friction force generated by the rotation of the screw driving the valve needle to rotate relative to the valve port is reduced, so that better reliability and stability are provided.

With regard to a specific structure of the second embodiment of the disclosure, an inner ring of the bearing 1-23*a* is sleeved with the valve needle 1-22*a* and fixed with each other, and an outer ring end surface of the bearing 1-23*a* is in contact with and abuts against a gasket 1-24*a*. One end of an elastic member 1-25*a* is connected with the screw 1-31*a*, and the other end is sleeved on the gasket 1-24*a*.

When the screw 1-31*a* rotates and descends, the elastic member 1-25*a* connected with the screw 1-31*a* rotates under the drive of the screw 1-31*a*, the elastic member 1-25*a* drives the gasket 1-24*a* to rotate, and the gasket 1-24*a* rotates to drive the outer ring of the bearing 1-23*a* abutting against the gasket to rotate. Because the inner ring of the bearing 1-23*a* is fixed on the valve needle 1-22*a*, the rotation of the screw 1-31 will be driven as the rotation of the outer ring of the bearing 1-23*a* relative to the inner ring. A plurality of rolling elements arranged in the bearing 1-23*a* transform a single-point rolling contact of the electronic expansion valve known to inventors into a multi-point rolling contact, a contact force is shared and borne by the plurality of rolling elements, a contact pressure on each contact point is reduced, and the rolling friction is reduced.

In some embodiments, the inner ring of the bearing 1-23*a* is in interference fit with an end of the valve needle 1-22*a* close to the screw 1-31, and the inner ring of the bearing 1-23*a* and the valve needle 1-22*a* are mutually fixed through interference fit. The mode that the inner ring is fixed through interference fit is relatively simple and convenient in assembly, and the assembly efficiency is improved.

It will be appreciated that in other embodiments, the inner ring of the bearing 1-23*a* may also be fixed to the valve needle 1-22*a* in other manners such as by gluing and riveting.

In some embodiments, the gasket 1-24*a* is pressed against the outer ring of the bearing 1-23*a* through an elastic action of the elastic member 1-25*a*, i.e., the outer ring of the bearing 1-23*a* is pressed against and fixed with the gasket 1-24*a* in an end face abutting manner. By adopting the fixing mode, the mounting of the gasket 1-24*a* is also relatively simple.

It will be appreciated that in other embodiments, the outer ring of the bearing 1-23*a* may also be in contact with and fixed to the gasket 1-24*a* in other manners such as a concave-convex fit.

In some embodiments, the gasket 1-24*a* has a substantially hollow cylindrical shape, a part of the gasket 1-24*a* close to the valve needle 1-22*a* extends radially outward therefrom and forms a bulge 1-241, and the gasket 24*a* abuts against the outer ring end surface of the bearing 1-23*a* through the bulge 1-241.

In some embodiments, a part of a hollow cavity body in the gasket 1-24*a* close to the valve needle 1-22*a* is provided as a conical surface (not labeled), and the conical surface is provided to match a conical top shape of the valve needle 1-22*a*, thereby improving an assembly fit relationship between the gasket 1-24*a* and the valve needle 1-22*a*.

In some embodiments, in order to realize an axial limiting of the valve needle 1-22*a* and prevent the valve needle 1-22*a* from being separated from the inner ring of the bearing 1-23*a* under an excessive pressure difference, the valve needle assembly 1-20 is further provided with a pressing sleeve 1-26, the pressing sleeve 1-26 and the valve needle sleeve 1-21*a* are fixed to each other, the pressing sleeve 1-26 is provided with a step surface 1-261, the pressing sleeve 1-26 abuts against the valve needle 1-22*a* through the step surface 1-261 and is not in direct contact with the valve needle, a small gap is reserved, and friction between the valve needle 1-22*a* and the pressing sleeve 1-261 is avoided, so that the valve needle 1-22*a* is prevented from being separated from the inner ring of the bearing 1-23*a* to affect a normal operation of the electronic expansion valve 1-100*a* due to the fact that the position of the valve needle 1-22*a* moving towards the valve port 1-11*a* is too deep.

In the present embodiment, the pressing sleeve 1-26 is fixed to the valve needle sleeve 1-21*a* by welding. It will be appreciated that in other embodiments, the pressing sleeve 1-26 may be fixed to the valve needle sleeve 1-21*a* in other manners such as riveting or gluing.

In some embodiments, due to the arrangement of the bearing 1-23*a* between the screw 1-31*a* and the valve needle 1-22*a*, a floating clearance between the inner and outer rings of the bearing 1-23*a* provides a degree of freedom of assembly of the valve needle 1-22*a*, which helps to eliminate coaxiality errors during machining and assembly. For example, a certain swinging angle is allowed between the valve needle 1-22*a* and the bearing 1-23*a*, and helps to reduce the coaxiality errors of the valve needle 1-22*a*.

Some embodiments of the disclosure further provide an air conditioning system (not shown) using the electronic expansion valve, the reliability and stability of the whole system are improved due to the use of the electronic expansion valve, and the air conditioning system has a broader application prospect.

In the electronic expansion valve provided by some embodiments of the disclosure, the bearing is arranged between the valve needle and the screw, so that the rotation of the screw is released by the bearing in a multi-point rolling contact. By transforming a single-point rolling contact sliding friction of an electronic expansion valve known to the inventors into a multi-point rolling contact rolling friction, the friction required for valve opening is reduced, damage caused by friction is reduced, the reliability and stability of the electronic expansion valve and the air conditioning system using the electronic expansion valve are improved, and the application prospect is broad.

Embodiment 3

Referring to FIGS. 9-15, the present embodiment provides a valve seat component of an electronic expansion valve that includes a valve seat 2-1, a first connecting pipe 2-2, a welding ring 2-3, and a second connecting pipe 2-4. The electronic expansion valve is applied to refrigeration equipment and mounted between a liquid storage cylinder and an evaporator, and a refrigerant in the liquid storage cylinder is transmitted to the evaporator through the electronic expansion valve.

Figure 15:
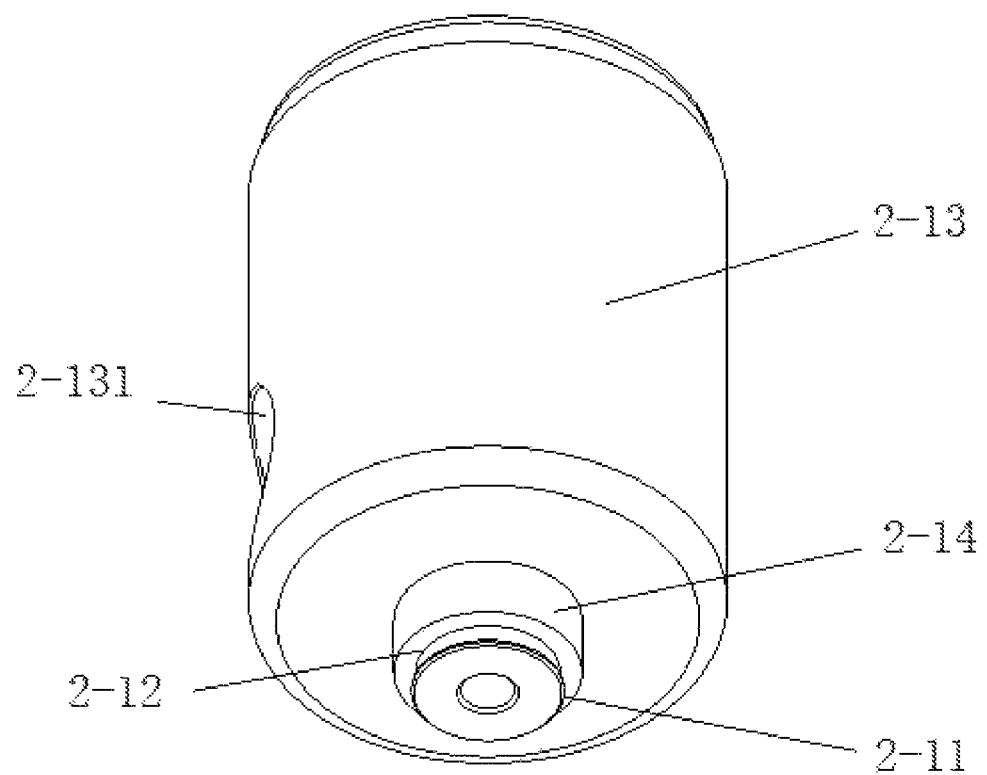
FIG. 15 is a stereogram of a valve seat of the electronic expansion valve in FIG. 9.

With continued reference to FIG. 15, one end of the valve seat 2-1 is provided with a boss structure 2-11, and an annular groove structure 2-12 connected with the boss structure 2-11. The valve seat 2-1 is made of a material of a valve body of an existing expansion valve and is of the same size as a valve seat of the existing expansion valve. In some embodiments, the valve seat 2-1 is integrally cylindrical and is composed of a plurality of sections which are sequentially connected, and the sections are coaxially arranged and sequentially communicated. The other end of the valve seat 2-1 is covered by a valve cover, and forms a closed end. In some embodiments, the boss structure 2-11 is frustoconical, and has a smaller radius at an end away from the annular groove structure 2-12. A groove of the annular groove structure 2-12 may be an annular groove, an annular groove having a rectangular cross-section, or a groove of another shape. It is to be noted here that the boss structure 2-11 and the annular groove structure 2-12, respectively, may be provided separately, or integrally formed and serve as end structures of the valve seat 2-1.

In the present embodiment, an accommodating cavity 2-16 is provided in the valve seat 2-1, and the accommodating cavity 2-16 is communicated with the first connecting pipe 2-2 and the second connecting pipe 2-4. The valve seat 2-1 includes a first mounting pipe 2-13 and a second mounting pipe 2-14, the first mounting pipe 2-13 and the second mounting pipe 2-14 are connected in an axial direction, and an outer diameter of the first mounting pipe 2-13 is larger than that of the second mounting pipe 2-14. The first connecting pipe 2-2 is sleeved on the second mounting pipe 2-14, and both the boss structure 2-11 and the annular groove structure 2-12 are arranged on the second mounting pipe 2-14. An insertion hole 2-131 is provided in a side wall of the first mounting pipe 2-13, and in some embodiments, the insertion hole 2-131 is a round hole.

The first connecting pipe 2-2 is sleeved on one end of the valve seat 2-1. The first connecting pipe 2-2 includes a sleeve section 2-21 and an extension section 2-22, a radius of the sleeve section 2-21 may be larger than a radius of the extension section 2-22, and certainly, the radius of the sleeve section 2-21 may also be equal to or smaller than the radius of the extension section 2-22. The sleeve section 2-21 is sleeved on the second mounting pipe 2-14 and is perpendicular to the first connecting pipe 2, and the extension section 2-22 is connected with the sleeve section 2-21.

In some embodiments of the disclosure, the welding ring 2-3 is clamped into a groove of the annular groove structure 2-12 and connected with an inner wall of the first connecting pipe 2-2, the valve seat 2-1 is in clearance fit with the first connecting pipe 2-2, and the welding ring 2-3 is in interference fit with the first connecting pipe 2-2. After the valve seat assembly is assembled, the assembly mode ensures that the first connecting pipe 2-2 does not fall off easily, the valve seat 2-1 is connected with the first connecting pipe 2-2 more stably, a penetration rate of welding inside the expansion valve is improved under the condition that the first connecting pipe 2-2 does not fall off easily, and meanwhile, a welding quality of the valve seat assembly is determined through appearance inspection by adopting a welding ring built-in mode.

The welding ring 2-3 is clamped into the groove of the groove structure 2-12 through the boss structure 2-11, the boss structure 2-11 limits a movement of the welding ring 2-3, and the welding ring 2-3 is prevented from falling off the valve seat 2-1. Moreover, when the valve seat 2-1 is connected to the first connecting pipe 2-2, the welding ring 2-3 is fixed on the valve seat 2-1 in advance, and the second mounting pipe 2-14 is inserted into the first connecting pipe 2-2, so that automatic assembly is realized, and installation of the welding ring 2-3 is facilitated. The second connecting pipe 2-4 is inserted into the insertion hole 2-131 and communicated with the first connecting pipe 2-2 through the valve seat 2-1. The second connecting pipe 2-4 is communicated with the liquid storage cylinder, so that the refrigerant in the liquid storage cylinder enters the accommodating cavity 2-16, and further enters the evaporator through the first connecting pipe 2-2 for evaporating and cooling the evaporator.

In summary, compared with the electronic expansion valve known to the inventors, the electronic expansion valve in the present embodiment has the following advantages:

According to the electronic expansion valve and the refrigeration system, the groove for accommodating the welding ring is provided on the valve seat 2-1 of the electronic expansion valve, so that the welding ring 2-3 is limited on the valve seat 2-1 to ensure that the valve seat 2-1 is in clearance fit with the first connecting pipe 2-2, and the welding ring 2-3 is in interference fit with the first connecting pipe 2-2. After the valve seat assembly is assembled, the penetration rate of welding inside the expansion valve is improved while the first connecting pipe 2-2 is not easy to fall off, and the welding ring determines the welding quality of a valve seat assembly through appearance detection in a built-in mode. Moreover, the valve seat 2-1 is provided with the boss structure 2-11 connected with the groove structure 2-12, so that the welding ring 2-3 is limited on the valve seat 2-1 without falling off, the welding ring 2-3 is mounted in the groove in advance during assembly, one end of the valve seat 2-1 and the welding ring 2-3 are inserted into the first connecting pipe 2-2 together to realize automatic assembly, and mounting of the welding ring 2-3 is facilitated.

Embodiment 4

The present embodiment provides a refrigeration system which includes various refrigeration devices and also is applied to various refrigeration equipments. The refrigeration system in the present embodiment includes a liquid storage container, an evaporator and a control valve. The control valve adopts the electronic expansion valve in Embodiment 3. The liquid storage container stores the refrigerant in a liquid state and is communicated with the second connecting pipe 2-4 of the electronic expansion valve. The evaporator is communicated with the first connecting pipe 2-2 of the electronic expansion valve and receives the refrigerant of the liquid storage container through the electronic expansion valve, so as to realize evaporation refrigeration. Here, it is to be noted that the effect of the refrigeration system of the present embodiment is the same as that of the electronic expansion valve of Embodiment 3, and the refrigeration system is applied as one system.

Embodiment 5

Figure 16:
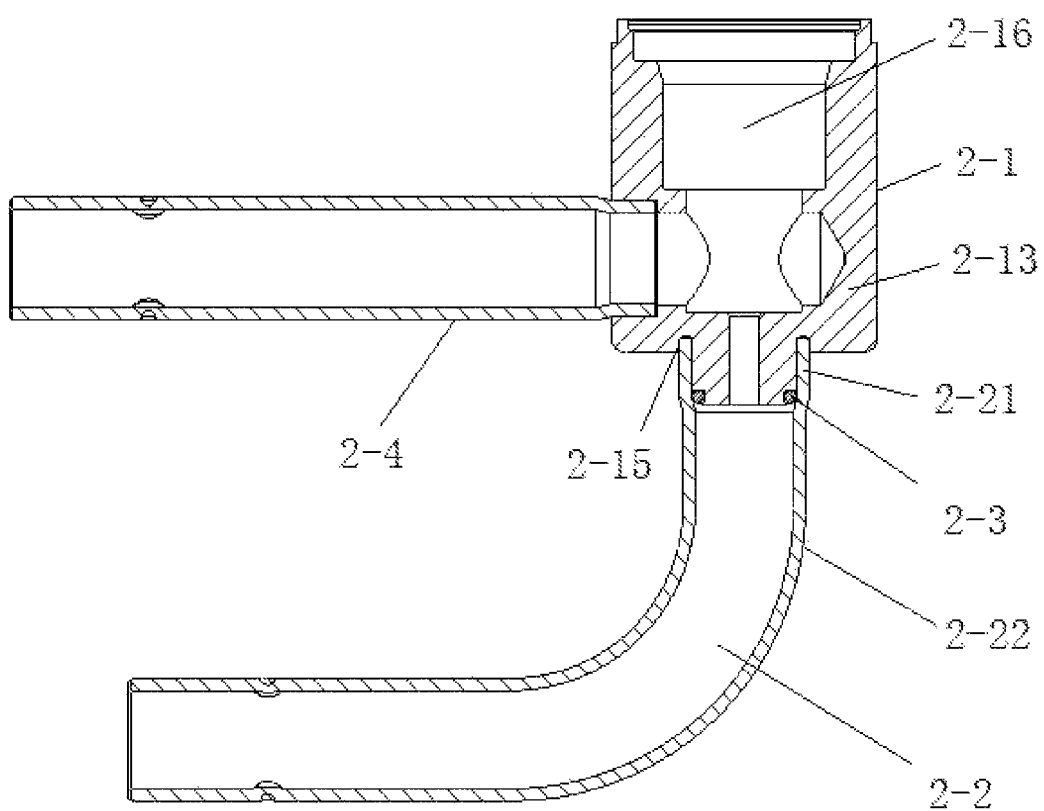
FIG. 16 is a structural diagram of a valve seat component of an electronic expansion valve according to a fifth embodiment of the disclosure.

Referring to FIG. 16, the present embodiment provides an electronic expansion valve similar to the electronic expansion valve of Embodiment 3, except that in the present embodiment, one end of the first mounting pipe 2-13 connected to the second mounting pipe 2-14 is provided with an annular insertion slot 2-15, and the first connecting pipe 2-2 is inserted into the insertion slot 2-15. Therefore, the first connecting pipe 2-2 is fixed with the valve seat 2-1, the first connecting pipe 2-2 is prevented from being skewed due to the problems of a bent pipe angle of the first connecting pipe 2-2, a pressing equipment tool and the like, or reasons such as an over-large gap amount, and a gap is formed between the valve seat 2-1 and the first connecting pipe 2-2, so that solders are not full.

Embodiment 6

Figure 17:
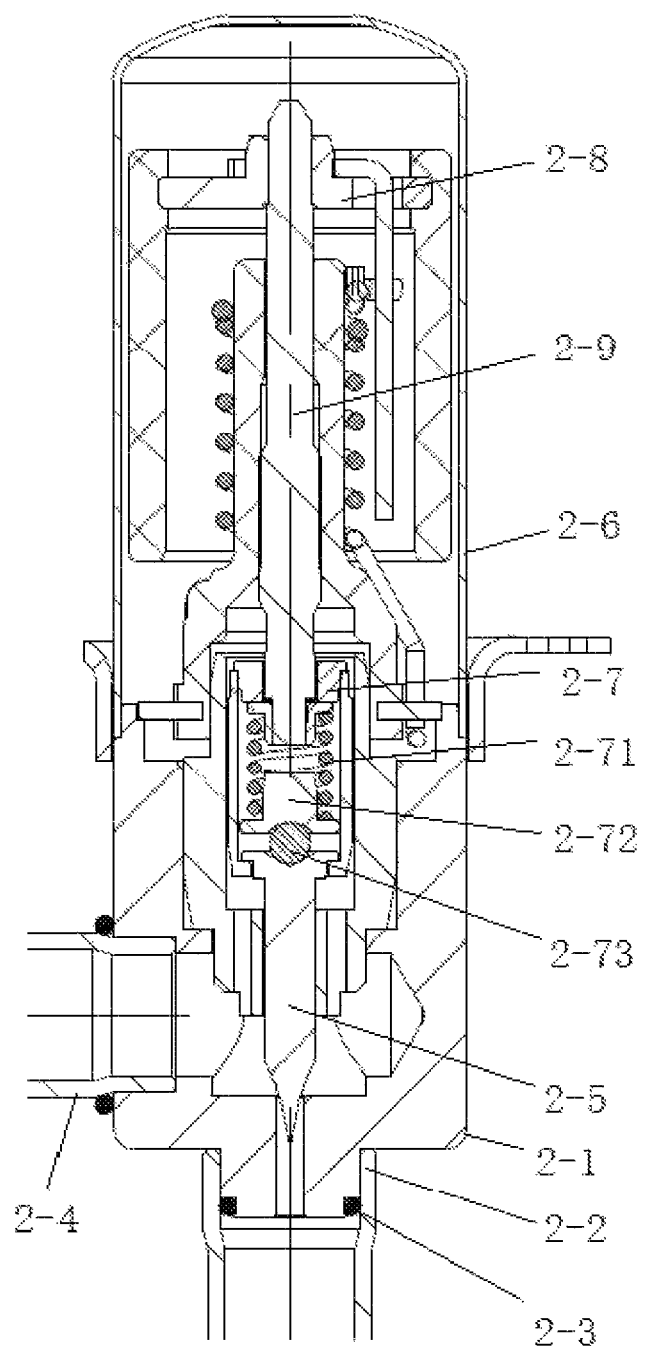
FIG. 17 is a structural diagram of an electronic expansion valve according to a sixth embodiment of the disclosure.

Referring to FIG. 17, the present embodiment provides an electronic expansion valve that is added with a valve needle 2-5, a cover body 2-6, a lifting assembly 2-7, a rotor assembly 2-8, and a screw assembly 2-9 based on Embodiment 3. An accommodating cavity 2-16 is provided in the valve seat 2-1, and the accommodating cavity 2-16 is communicated with the first connecting pipe 2-2 and the second connecting pipe 2-4. Specifically, the cover body 2-6 is mounted on the valve seat 2-1, and defines the accommodating cavity 2-16 with the valve seat 2-1.

The valve needle 2-5 is arranged in the valve seat 2-1 and provided with a needle head facing the second mounting pipe 2-14, and a maximum outer diameter of the needle head is larger than an inner diameter of the second mounting pipe 2-14. The lifting assembly 2-7 is arranged in the accommodating cavity 2-16, has a central axis superposed with a central axis of the valve seat 2-1, and is used to drive the valve needle 2-5 to lift along the central axis of the valve seat 2-1 through rotation. The rotor assembly 2-8 is rotatably mounted in the cover body 2-6, the screw assembly 2-9 is mounted in the cover body 2-6, and an axial limiting end is connected with the lifting assembly 2-7. The rotor assembly 2-8 is arranged around the screw assembly 2-9 and used to drive the screw assembly 2-9 to rotate and move axially. In this way, the rotor assembly 2-8 may rotate, so that the lifting assembly 2-7 rotates and drives the valve needle 2-5 to lift, and the gap between the needle head and the second mounting pipe 2-14 is changed.

In some embodiments, the lifting assembly 2-7 includes a spring 2-71, a gasket 2-72, and a ball 2-73. The spring 2-71 is arranged in the lifting assembly 2-7, and one end is connected with the screw assembly 2-9, the other end is connected with the gasket 2-72 and to the valve needle 2-5 through the ball 2-73. The ball 2-73 is arranged between the gasket 2-72 and the valve needle 2-5, two ends slide on a side wall of the valve seat 2-1 in the direction of the central axis of the valve seat 2-1, and friction of the lifting assembly to the valve needle during rotation and movement of the lifting assembly in the direction of the central axis of the valve seat driven by the screw assembly is reduced. As the lifting assembly 2-7 rotates and moves up and down along with the screw assembly 2-9, the valve needle 2-5 is lifted, so that the size of the gap between the needle head and the second mounting pipe 2-14 is controlled.

When the flow of the electronic expansion valve needs to be regulated, a user can control the flow by controlling the stator assembly to drive the rotor assembly 2-8 to rotate, so that the valve needle 2-5 moves in the axial direction of the valve seat 2-1, the gap between the needle head and the second mounting pipe 2-14 is increased or decreased, and the refrigeration effect of the evaporator is controlled. Meanwhile, the phenomenon of insufficient area utilization and cylinder knocking of the evaporator is prevented.

Embodiment 7

The present embodiment provides an electronic expansion valve that is added with a thermistor based on Embodiment 3. The thermistor is arranged at an outlet of the evaporator, connected with a stator assembly fixed on a positioning piece of the valve seat 2-1 in parallel and then connected to a power supply. The resistance value of the thermistor changes along with the change of the temperature, so that a voltage across the stator assembly changes along with the change of the temperature, the position of the valve needle 2-5 further changes along with the change of the temperature, and the flow of the electronic expansion valve is regulated.

It should be appreciated by those of ordinary skill in the art that the above-described embodiments are merely illustrative of the disclosure and are not intended to be limiting of the disclosure. Appropriate modifications and changes made to the above-described embodiments will fall within the scope of claims of the disclosure as long as they are within the scope of the essential spirit of the disclosure.

The above is only the embodiments of the disclosure, not intended to limit the disclosure. As will occur to those skilled in the art, the disclosure is susceptible to various modifications and changes. Any modifications, equivalent replacements, improvements and the like made within the spirit and principle of the disclosure shall fall within the scope of protection of the disclosure.

What is claimed is:

1. An electronic expansion valve, comprising: a screw, a valve needle, and an elastic member, wherein one end of the elastic member acts on the screw and the other end acts on the valve needle, wherein the electronic expansion valve further comprises a bearing arranged between the screw and the valve needle, and the bearing has an inner ring and an outer ring, one of the screw and the valve needle is fixed with the inner ring of the bearing, and the other of the screw and the valve needle acts on the outer ring of the bearing through the elastic member; a gasket, arranged between the elastic member and the outer ring of the bearing, wherein the gasket is connected with the outer ring of the bearing under an abutment of the elastic member.

2. The electronic expansion valve according to claim 1, wherein the screw is fixed with the inner ring of the bearing, and the valve needle is connected with the outer ring of the bearing through the elastic member and the gasket.

3. The electronic expansion valve according to claim 2, comprising: a valve needle sleeve for fixing the valve needle, wherein a side surface of the screw extends outward in a radial direction of the screw and forms a bulge, and the bulge is flush with an inner side surface of the valve needle sleeve.

4. The electronic expansion valve according to claim 2, wherein the screw is in interference fit with the inner ring of the bearing.

5. The electronic expansion valve according to claim 1, wherein the valve needle is fixed with the inner ring of the bearing, and the screw is connected with the outer ring of the bearing through the elastic member and the gasket.

6. The electronic expansion valve according to claim 5, wherein the valve needle is in interference fit with the inner ring of the bearing.

7. The electronic expansion valve according to claim 5, further comprising: a pressing sleeve, provided with a step surface, wherein the step surface abuts the valve needle to limit an axial movement of the valve needle.

8. The electronic expansion valve according to claim 5, wherein the gasket has a cavity extending in an axial direction of the gasket, and an inner side surface of the gasket close to the valve needle is a conical surface.

9. The electronic expansion valve according to claim 1, comprising:
a valve seat; and
a first connecting pipe, sleeved on an end of the valve seat, wherein the end of the valve seat is provided with an annular groove structure and a boss structure connected with the annular groove structure, and the electronic expansion valve further comprises:
a welding ring, clamped into a groove of the annular groove structure and connected with an inner wall of the first connecting pipe,
wherein the valve seat is in clearance fit with the first connecting pipe, and the welding ring is in interference fit with the first connecting pipe.

10. The electronic expansion valve according to claim 9, wherein the valve seat comprises a first mounting pipe and a second mounting pipe which are connected along an axial direction, an outer diameter of the first mounting pipe is larger than an outer diameter of the second mounting pipe, the first connecting pipe is sleeved on the second mounting pipe, and both the boss structure and the annular groove structure are arranged on the second mounting pipe.

11. The electronic expansion valve according to claim 10, wherein an insertion hole is provided in a side wall of the first mounting pipe, and the electronic expansion valve further comprises:
a second connecting pipe, inserted into the insertion hole and communicated with the first connecting pipe through the valve seat.

12. The electronic expansion valve according to claim 10, wherein the first connecting pipe comprises a sleeve section and an extension section, wherein the sleeve section is sleeved on the second mounting pipe and is perpendicular to the first connecting pipe, and the extension section is connected to the sleeve section.

13. The electronic expansion valve according to claim 10, wherein an end, connected to the second mounting pipe, of the first mounting pipe, is provided with an annular insertion slot, and the first connecting pipe is inserted into the annular insertion slot.

14. The electronic expansion valve according to claim 11, wherein an accommodating cavity is provided in the valve seat, the accommodating cavity communicates the first connecting pipe and the second connecting pipe, and the electronic expansion valve further comprises:
a valve needle, arranged in the valve seat and provided with a needle head facing the second mounting pipe, a maximum outer diameter of the needle head being larger than an inner diameter of the second mounting pipe.

15. The electronic expansion valve according to claim 14, further comprising:
- a cover body, mounted on the valve seat, and defining the accommodating cavity with the valve seat;
- a lifting assembly, arranged in the accommodating cavity, having a central axis superposed with a central axis of the valve seat, and configured to drive the valve needle to lift along the central axis of the valve seat through rotation;
- a rotor assembly, mounted in the cover body rotatably; and
- a screw assembly, mounted in the cover body, and having an axial limiting end connected with the lifting assembly, the rotor assembly being arranged around the screw assembly and configured to drive the screw assembly to rotate and move axially.

16. The electronic expansion valve according to claim 15, wherein the lifting assembly comprises a spring, a gasket, and a ball, wherein the spring is mounted in the lifting assembly, one end of the spring is connected with the screw assembly and the other end is connected with the gasket and to the valve needle through the ball, and the ball is placed between the gasket and the valve needle.

17. The electronic expansion valve according to claim 16, wherein the electronic expansion valve is mounted between a liquid storage cylinder and an evaporator, a refrigerant in the liquid storage cylinder is transmitted to the evaporator through the electronic expansion valve, and the electronic expansion valve further comprises:
- a thermistor, arranged at an outlet of the evaporator, connected with a stator assembly fixed on a positioning piece of the valve seat in parallel and then connected to a power supply.

18. An air conditioning system, comprising: the electronic expansion valve according to claim 1.

19. A refrigeration system, comprising: a liquid storage container, an evaporator and a control valve, wherein a refrigerant in the liquid storage container is transmitted to the evaporator through the control valve, the control valve being the electronic expansion valve according to claim 9.

20. An electronic expansion valve, comprising: a screw, a valve needle, and an elastic member, wherein one end of the elastic member acts on the screw and the other end acts on the valve needle, wherein the electronic expansion valve further comprises a bearing arranged between the screw and the valve needle, and the bearing has an inner ring and an outer ring, one of the screw and the valve needle is fixed with the inner ring of the bearing, and the other of the screw and the valve needle acts on the outer ring of the bearing through the elastic member; the valve needle and an inner ring of the bearing are fixed with each other, the screw abuts against an outer ring end surface of the bearing by an elastic member.

\* \* \* \* \*